(12) United States Patent
Macori et al.

(10) Patent No.: US 11,459,826 B2
(45) Date of Patent: Oct. 4, 2022

(54) ASSEMBLY FOR MOVING EXCAVATION OR DRILLING EQUIPMENT AND ACTUATING METHOD THEREFOR

(71) Applicant: SOILMEC S.P.A., Cesena (IT)

(72) Inventors: Fabrizio Macori, Cesena (IT); Matteo Amadori, Cesena (IT); Alessandro Ditillo, Cesena (IT)

(73) Assignee: SOILMEC S.P.A., Cesena (IT)

( * ) Notice: Subject to any disclaimer, the term of this patent is extended or adjusted under 35 U.S.C. 154(b) by 279 days.

(21) Appl. No.: 16/961,911

(22) PCT Filed: Jan. 15, 2019

(86) PCT No.: PCT/IB2019/050288
§ 371 (c)(1),
(2) Date: Jul. 13, 2020

(87) PCT Pub. No.: WO2019/142091
PCT Pub. Date: Jul. 25, 2019

(65) Prior Publication Data
US 2020/0386052 A1 Dec. 10, 2020

(30) Foreign Application Priority Data
Jan. 16, 2018 (IT) .......................... 102018000001088

(51) Int. Cl.
*E21B 3/02* (2006.01)
*E21B 19/084* (2006.01)
(Continued)

(52) U.S. Cl.
CPC ................ *E21B 3/045* (2013.01); *E02F 3/06* (2013.01); *E21B 15/00* (2013.01); *E21B 19/008* (2013.01); *E21B 7/021* (2013.01)

(58) Field of Classification Search
CPC .......... E21B 3/02; E21B 15/00; E21B 19/084; E21B 7/02–027
See application file for complete search history.

(56) References Cited

U.S. PATENT DOCUMENTS

| 4,371,041 A | 2/1983 | Becker et al. |
| 4,570,706 A * | 2/1986 | Pugnet ................... E21B 19/16 175/162 |

(Continued)

FOREIGN PATENT DOCUMENTS

| CN | 202913951 U | 5/2013 |
| DE | 4132314 C1 | 12/1992 |

(Continued)

OTHER PUBLICATIONS

International Search Report and Written Opinion for International Application No. PCT/IB2019/050288, dated Apr. 18, 2019.

(Continued)

*Primary Examiner* — Kipp C Wallace
(74) *Attorney, Agent, or Firm* — Merchant & Gould P.C.

(57) ABSTRACT

An assembly for driving excavating equipment for an excavating machine includes a drive assembly sliding along a mast of a machine, for driving the drilling equipment; and an actuator. The drive assembly includes a first structure with guide members for sliding along the mast; and a second support structure to support the drilling equipment. The first and second support structures are mutually movable. The drive assembly has at least two operating configurations, for setting at least two excavation center-to-center distances. In the operating configurations of the drive assembly, the first and second support structures are mutually rigidly and directly constrained. While switching between operating configurations, the first and second support structures are always directly mechanically constrained to each other. The actuator controls movement between the first structure and (Continued)

the second support structure and carries out further operative functions for driving parts of an excavating machine or drilling equipment.

15 Claims, 14 Drawing Sheets

(51) Int. Cl.
*E21B 3/04* (2006.01)
*E02F 3/06* (2006.01)
*E21B 15/00* (2006.01)
*E21B 19/00* (2006.01)
*E21B 7/02* (2006.01)

(56) References Cited

U.S. PATENT DOCUMENTS

| | | | |
|---|---|---|---|
| 11,060,361 B2* | 7/2021 | Berry | E21B 3/02 |
| 2005/0269104 A1 | 12/2005 | Folk et al. | |
| 2011/0174511 A1* | 7/2011 | Biserna | E21B 7/02 |
| | | | 173/141 |
| 2011/0203820 A1* | 8/2011 | Marica | E21B 19/24 |
| | | | 104/118 |
| 2013/0233625 A1 | 9/2013 | Robinson et al. | |
| 2013/0302114 A1* | 11/2013 | Reddy | E21B 15/00 |
| | | | 414/22.55 |
| 2014/0182868 A1* | 7/2014 | Bowley | E21B 19/02 |
| | | | 173/39 |

FOREIGN PATENT DOCUMENTS

| | | |
|---|---|---|
| EP | 0433892 A1 | 6/1991 |
| EP | 0548900 A2 | 6/1993 |
| EP | 1158136 A1 | 11/2001 |
| EP | 1983149 A2 | 10/2008 |

OTHER PUBLICATIONS

International Preliminary Report on Patentability for International Application No. PCT/IB2019/050288, dated Apr. 16, 2020.

* cited by examiner

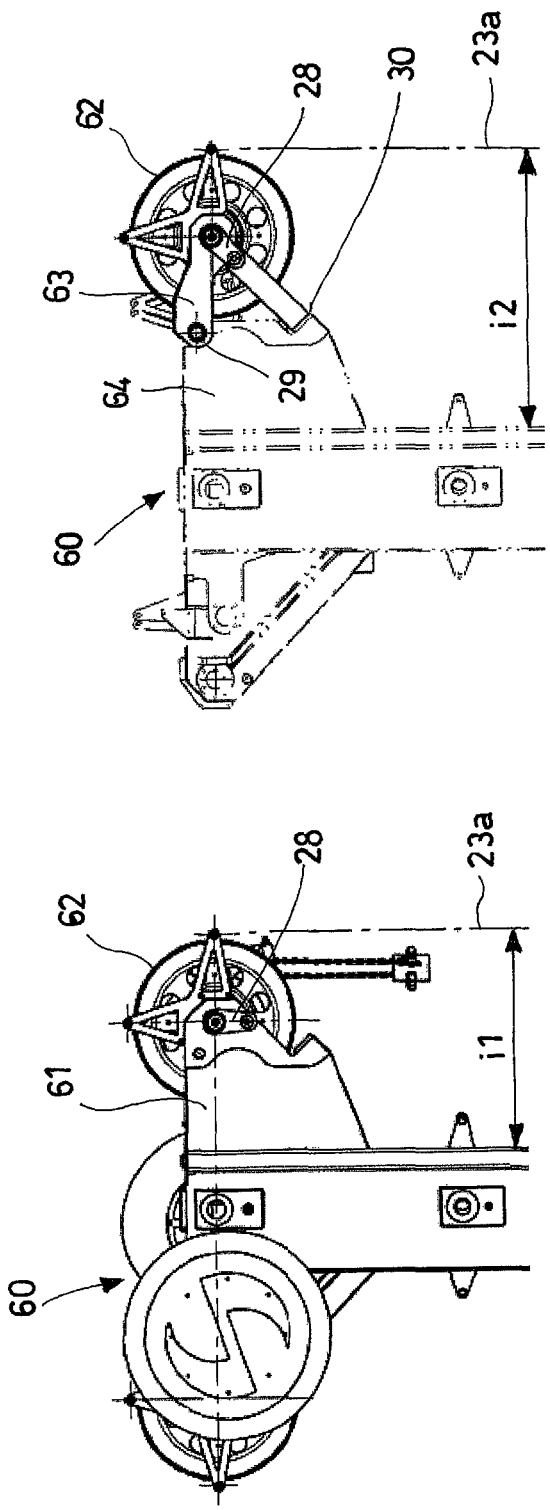

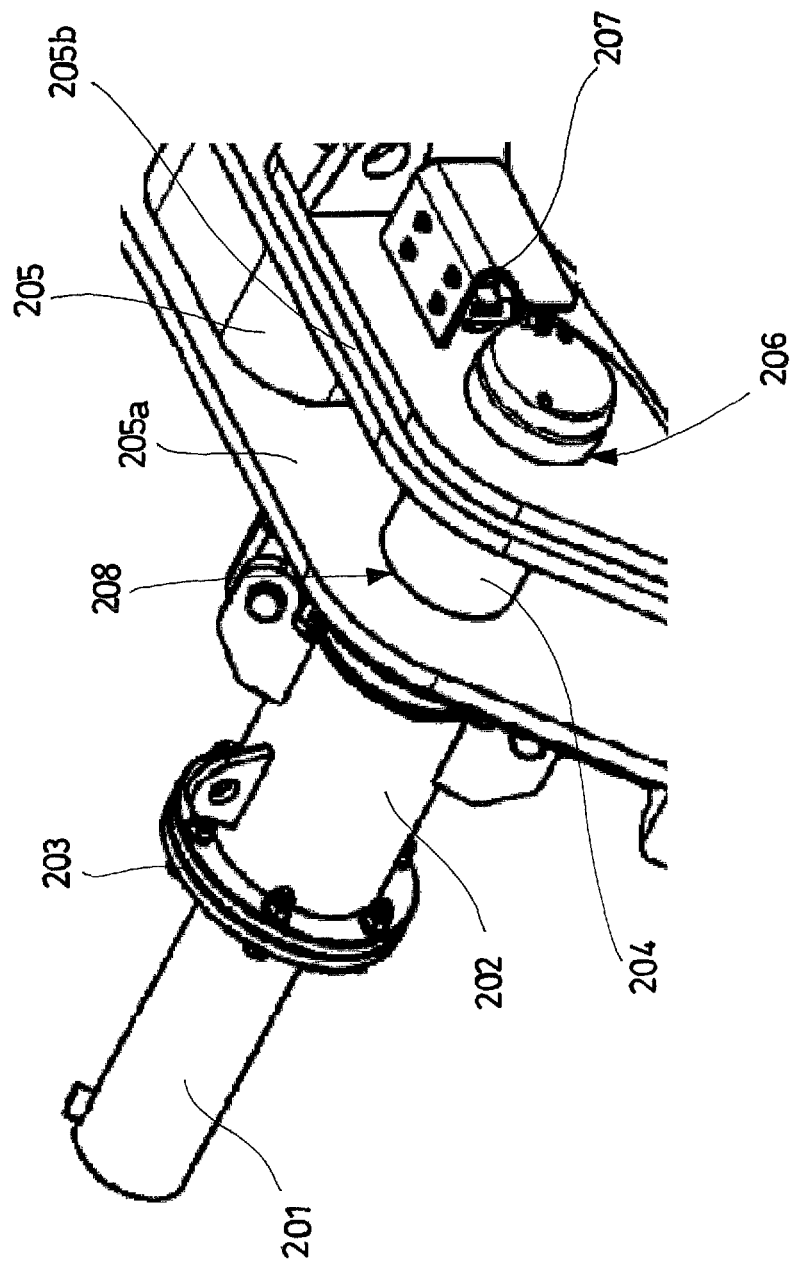

ASSEMBLY FOR MOVING EXCAVATION OR DRILLING EQUIPMENT AND ACTUATING METHOD THEREFOR

This application is a National Stage Application of International Application No. PCT/IB2019/050288, filed Jan. 15, 2019, which claims benefit of Serial No. 102018000001088, filed Jan. 16, 2018 in Italy and which applications are incorporated herein by reference. To the extent appropriate, a claim of priority is made to each of the above-disclosed applications.

TECHNICAL FIELD

The present invention finds application in the field of drilling techniques, and relates to an assembly, comprising a drive assembly and an actuator, for driving parts of ground drilling equipment. The present invention further relates to a system comprising such an assembly, adapted to allow changing the excavation centre-to-centre distance in an excavating machine.

Furthermore, the present invention relates to a method for changing the excavation centre-to-centre distance in an excavating machine.

TECHNOLOGICAL BACKGROUND/STATE OF THE ART

It is known that the procedures for making a foundation or ground consolidation excavation rely mainly on a self-moving machine, generally a tracked one, equipped with a rotating tower, also called "upper-structure" or "upper-frame", which comprises an operator cabin and the propulsion and control units used for the driving and drilling operations. A mast is connected to the rotating tower with one or more degrees of freedom, in particular directly to the frame of the rotating tower or to a telescopic movable part projecting out from the frame and sliding thereon towards the excavation, referred to as "spotter frame", or through more or less complex linkages, which allow adjusting the spatial position of the mast, thus allowing the mast to take different angles and/or to move closer to or farther from the rotating tower. The mast comprises a power assembly and ground excavating means. The mast is an elongated boxed-type or lattice-type element. Said mast is delimited at the top by a head and at the bottom by a foot adapted to transmit to the ground a part of the loads acting upon the structures. The power assembly, which may be either hydraulic or electric, is also called drill head or "rotary". The rotary moves along said mast between the head and the foot, transmitting the rotatory motion and a forward or upward force to excavating or drilling means or tools. The excavating means in turn comprise: a drill rod, which may be either simple or telescopic, also referred to as "kelly"; and an excavating or consolidating tool. The excavating means may be mounted slideable relative to the rotary and may be equipped with suitable independent driving means.

For the purposes of the present description, said excavating means are defined as excavating equipment.

The driving means for the rotary and the excavating means, employed for ensuring a constant thrust on the excavating tool and/or for extracting the drill string when the excavation is complete, are substantially of two kinds:

driving systems with flexible elements: rope-type hoist or chain-type motoreducer;
 rigid driving means: e.g. operated by means of a hydraulic cylinder.

The driving means with flexible elements, more specifically rope-type driving means, require the application, on the machine or directly on the mast, of one or more hoists comprising a drum around which a rope is wound. Pulls may be either direct or "multiplied" by means of transmission systems, in which case the insertion/extraction force will be increased at the cost of a lower speed of the excavating means.

Rigid driving means mostly consist of linear actuators or cylinders arranged on the front side of the machine, or excavation side. Said linear actuators are fastened at one end to the mast, and are connected at the other end to the rotary in order to transmit thereto the push and pull forces while moving it longitudinally, guided by the mast.

The rotary is normally installed on the mast with an excavation axis located at a predefined distance from the mast guides, on which the rotary slides longitudinally. The distance of the excavation axis of the rotary from the mast guides depends on the dimensions of the guiding means on the mast, of the driving means along the rotary tower, and of the power means for turning the excavating tools. Such distance is generally known as "excavation centre-to-centre distance". As a function of the excavation centre-to-centre distance it is possible to define the loads acting upon the structures, particularly upon the mast, and the general stability of the excavating or drilling machine.

Given an excavation centre-to-centre distance, the maximum diameter of the excavating tool that can be used and driven in front of the mast must be smaller than or equal to twice the value of the excavating centre-to-centre distance, in order to avoid that the excavating tool might come in contact with the mast or with the means installed thereon, such as, for example, ropes, pulleys, fittings, which generally protrude past the mast structure.

In the course of time, however, the increasing power of the motors installed on the self-moving rotating towers, or externally supplied to such rotating towers, and the increasing torque outputs of the rotaries installed on machines of the same size or category, have made it possible to increase the drilling diameters, resulting in a fresh need for arranging the excavating equipment at longer excavation centre-to-centre distances, so as to allow drilling while at the same time ensuring the necessary stability of the machine.

Patent EP 0,433,892 describes excavating or drilling machines equipped with a parallelogram-type linkage. In these machines, the guiding mast is connected to the tower through an articulated quadrilateral that can be moved by means of a motor unit. The elements connected to the frame rotate about pins. In this solution, the mast translates without rotating, keeping its own inclination unchanged throughout the movement.

The parallelogram-type linkage is conveniently used in order to change the excavation radius, i.e. the distance between the excavation axis and the axis of rotation of the tower on the tracked carriage, by a very high value, even more than one metre. In this solution, when the working radius is at its minimum the mast is close to the rotating tower and in a raised position. Conversely, when the working radius is at its maximum, i.e. in the fully extended position, the mast translates forwards and goes down, moving away from the tower and dropping towards the ground.

Conveniently, in the configuration with the minimum working radius it is possible to use the room under the mast to install a tool having a very big diameter, which could not otherwise be installed in front of the mast. However, this simple solution is not applicable when, instead of using a drill bit of a mechanical mixing tool, the tool to be used has a cylindrical stem equipped with an openable base, called bucket, because the height between the mast and the ground may nevertheless be insufficient to allow the base to open and discharge the material excavated from the borehole.

Another condition that poses a diameter limitation is found in the so-called "segmental casing" applications, wherein the casing elements may have considerable longitudinal dimensions, even as long as 6 m, to allow for an advantageous reduction of the excavation times. As in the previous case, in this case as well the rod will have a maximum diameter compatible with the excavation centre-to-centre distance, since it will inevitably end up operating in front of the mast.

It is therefore advantageous, in such cases, to move the excavation axis away from the mast, so that bigger tool diameters can be used.

EP 0,548,900 teaches to change the excavation centre-to-centre distance in a mechanized way in a mobile drilling rig for hydrocarbon exploration, by using a kinematic connection between the rotary and the rotary support carriage sliding in a guided manner along the mast. Said connection is an articulated quadrilateral that causes the rotary to translate from a first retracted working position to an extended service position for picking up the drill rods to be added to the string. Several drawbacks make this solution unsuitable for applications wherein drilling machines are used for building foundation piles, particularly piles having considerable dimensions. Such drilling machines for hydrocarbon exploration as described in the above-mentioned patent are different, in that they utilize much smaller drill rods and tools, generally a few hundred millimetres in diameter. Moreover, the loads that stress the structures while raising a drill rod as described in said patent are much smaller than those generated during the working or excavation phase. Besides, in the application described in said patent there are no vibrations and fatigue loads that might result in an unstable connection between the rotary and the mast. Furthermore, the linkage is bulky, heavy, and reduces stability, in addition to being complex and expensive. Also, the solution described in said patent requires the use of a dedicated actuator, exclusively adapted to drive said linkage, being connected to the carriage and to the linkage itself. The presence of an additional actuator implies higher costs and more maintenance, and also requires the implementation of a power supply for the actuator in order to impart the movements.

According to other solutions employed in this field, the rotary is mounted on a guiding structure or carriage that can be replaced in order to adapt it to the centre-to-centre distance. In practice, in order to obtain a shorter excavation centre-to-centre distance a first type of carriage is mounted, which protrudes only slightly from the mast; whereas to obtain a longer excavation centre-to-centre distance a second type of carriage is mounted, which protrudes more from the mast.

As an alternative, one type only of carriage is used, to which a spacer can then be added between the carriage and the rotary in order to move the rotary away from the mast.

These solutions offer the advantage that they provide a rigid connection between the rotary and the carriage, without the interposition of any kinematic elements. Direct connections are therefore used, by means of pins or screws. On the other hand, however, the centre-to-centre distance cannot be changed easily and quickly. In order to implement these solutions, in fact, time-consuming and difficult operations are necessary for dismounting the rotary, which must be completely released or disconnected from the carriage, and for substituting the carriages, which generally also carry connection and transmission means for drive units and hydraulic components. By way of example, reference can be made to patent EP 1,983,149, wherein some solutions are disclosed for facilitating the mounting and dismounting of the rotary in transport conditions, so that the person skilled in the art can understand the complexity of the operations required for dismounting the carriage, on which there are many elements such as pulleys, ropes and hydraulic units.

With reference to FIG. 1, there is shown a drilling machine 100 according to the prior art, which comprises a rotating tower 1 comprising: a base frame connected to an undercarriage 2 through a vertical-axis rotation centre plate; suitable drive motor means; a cabin with a control seat, from which the operator carries out the positioning checks and the excavation operations; power and control assemblies, contained in suitable compartments, for supplying primary power, whether hydraulic or electric, to the machine; one or more ballast elements, arranged in the rear, for stabilising drilling machine 100.

Said self-moving tracked undercarriage 2 is driven by rotating tower 1 through a connection joint.

Drilling machine 100 further comprises a connection linkage 3 between a mast 5 and rotating tower 1; said linkage 3 allows mast 5 to be moved in space with at least one degree of freedom, preferably by rotating and translating relative to the base frame. In particular, said linkage 3 is an articulated quadrilateral made up of two elements connected to the base frame of rotating tower 1 and at least one linear actuator, e.g. a hydraulic cylinder, that connects the base frame of rotating tower 1 to one of the other elements of the articulated quadrilateral. An upper support element of linkage 3 is connected to mast 5 through a pin-type connection that allows mast 5 to rotate from a transport configuration, in which mast 5 is substantially horizontal, to a working configuration, in which mast 5 is substantially vertical. Rotation of mast 5 is imparted by a pair of hydraulic jacks that connect mast 5 to the upper element of linkage 3. Said pair of jacks also allow mast 5 to rotate transversally, in addition to longitudinally, through a different modulation of the opening thereof. This results in four tilting adjustments, i.e. frontal and lateral, of mast 5.

Said mast 5 consists of one or more central members, and is connected at the top to a head 6 that supports the pulleys adapted for the sliding of a main rope 23a. Said main rope 23a is normally used for moving a drill rod or kelly 10, or for moving a continuous flight auger or CFA drill head or rotary 8, in case of drilling without a kelly 10. The pulleys of head 6 are also adapted for the sliding of a service rope 23b, which is used for moving the loads and equipment useful for preparing the drilling process. To the base of mast 5 a bottom foot 7 may be connected, which generally carries an internal hydraulic cylinder that, by extending itself, causes a support plate connected to the end thereof to go down to ground "G". Said bottom foot 7 is used in order to give stability to the machine and to be able to exert the maximum extraction forces, particularly in cased drilling operations, e.g. comprising an outer casing protecting the walls of the borehole, and for other excavation technologies, such as, for example, continuous flight auger drilling, also referred to as CFA. On mast 5 there is a third hoist 13, called pull-down hoist, which is used for moving rotary 8. Two branches of a rope are connected to rotary 8, at the top in order to exert an extraction or pull force, and at the bottom in order to exert an insertion or push force on the excavation tools. The rope may be either connected directly to rotary 8 or applied onto a sliding carriage 9.

Said rotary 8 is adapted to slide along mast 5 through mechanical guiding or countering means, which allow for the guided sliding thereof along mast 5. These guiding or countering means may be connected to rotary 8 in a non-removable manner, or may be connected in a removable manner on a distinct component defined as rotary carriage 9. Said rotary carriage 9 is adapted to support the driving means, e.g. the connections for pull and/or push ropes, or transmission pulleys in case of multiple-tackle pulls, which allow reducing the dimensions of pull-down hoist 13. Said guiding or countering means are, for example, guiding sliders or, as an alternative, rollers. Normally rotary carriage 9 is employed on drilling machines 100 when it is necessary to remove rotary 8 from mast 5, e.g. in transport conditions, in order to reduce the total weight of the machine. In this case, the connection between the carriage and the rotary is effected by means of removable connections, and only one operating configuration can be taken, which defines a single excavation centre-to-centre distance.

Said drill rod or kelly 10, e.g. a telescopic rod with multiple elements that can run one into the other as shown in FIG. 1, is slideably connected inside rotary 8 and is moved by the main hoist, the end of which is connected to the innermost drilling member, generally through the interposition of a swivelling element. The main hoist may be installed either on rotating tower 1 (as in FIG. 1) or on mast 5, just like pull-down hoist 13. When the rope of the hoist is released, kelly 10 goes down until the outer member abuts against rotary 8, while the inner members continue to descend under their own weight. When the rope is pulled, the members are compacted, thus extracting kelly 10 from the borehole. Rotary 8 can exert a thrust force on kelly 10 by exploiting backing ledges comprised on the outermost member of kelly 10, which are also used for transmitting the excavation torque, e.g. for friction rods, or with mechanical joints implemented through horizontal profiles of the ledges, e.g. for mechanical locking rods. At the top, kelly may be guided by a rod guiding element 11, also connected to mast 5 in a slideable manner, and is preferably provided with guiding or backing members, so as to run in the same way as rotary 8 or carriage 9. Rod guiding member 11 is normally used for improving the guiding of drill rod or kelly 10 and for keeping the excavating tool always aligned and accurate, particularly when the guiding provided to kelly 10 by rotary 8 is not sufficient to keep the kelly in alignment, especially for inclined, non-vertical drilling.

Drilling machine 100 further comprises an excavating tool 12, represented in FIG. 1 as a drill bit, connected to drill rod 10, in particular to the innermost member of kelly 10, and having a profile capable of transmitting pull and extraction forces and torque.

As clearly shown in FIG. 1, when rotary 8 is mounted on carriage 9 there is a distance between the excavation axis, coinciding with the axis of drill rod 10 and with the axis of rotation of excavating tool 12, and the guides of mast 5, which distance is referred to as excavation centre-to-centre distance "i".

Diameter "Ø" of excavating tool 12 is correlated with excavation centre-to-centre distance "i". Diameter "Ø" must be equal to or smaller than twice the value of excavation centre-to-centre distance "i", i.e. it must not exceed twice the value of excavation centre-to-centre distance "i". In particular, it is preferable that said diameter "Ø" of the tool is smaller than twice the value of excavation centre-to-centre distance "i", so as to leave the necessary clearance for the excavating tools and for the protruding elements on mast 5, such as, for example, the transmission pulleys for the rope of pull-down hoist 13, and the ropes themselves, installed on the front side of the mast, in the lower part thereof, particularly the pushing branch. The position of linkage 3, shown in FIG. 1 in the fully retracted configuration, produces a distance between the excavation axis and the axis of rotation of tower 1, referred to as working radius R max. By changing the position of linkage 3, in particular by extending it forwards towards the excavation face, mast 5 will translate and go down, thus further reducing the ground clearance.

FIG. 2 shows the same drilling machine 100, from which said foot 7 has been removed from the bottom part of mast 5. Since linkage 3 is of the parallelogram type, linkage 3 connects to mast 5 at a very tall height from ground "G", several metres above ground, and therefore the available space under mast 5 can be used for inserting excavating tools 12 having diameters "Ø" much greater than twice excavation centre-to-centre distance "i".

Not all drilling technologies are compatible with this geometry, in which tool 12 remains constantly under the bottom end of mast 5. In fact, in some cases tubes need to be moved, typically having a variable length of 3 to 6 m, so that they can no longer be housed underneath mast 5, and therefore their diameter will have to be correlated with excavation centre-to-centre distance "i" as previously specified. This problem also arises when excavating tools called "buckets" are used, which may be as high as 2 m, and which comprise a bottom bucket that remains partially open during the excavation process, thus promoting the entry of the material inside the tool; once extracted from the borehole, the bucket can be opened in order to discharge the excavated material. With tools having a diameter of 3 m, the minimum height necessary to make room for the open bucket and the cylindrical stem of the tool may exceed 5 m, and therefore also in this case the tool could not be housed underneath mast 5.

It is known the patent application EP0548900A2 in which is disclosed a drilling machine of the type comprising a drilling tower fixed in a reclinable manner on a transporting vehicle (11) and provided with motive power units (15) and a driving head (30) for driving the drill rods. The drilling tower is of telescopic type slidable along a fixed guide structure or lattice (24) by the action of a hydraulic piston (23), the telescopic tower being provided at its ends with a series of pulleys (27, 35) to allow the movement of flexible transmission means (28, 34) having one end connected to said driving head (30) and the other end connected to a point on the fixed structure (24), so as to form a closed ring about the tower. The drilling machine is also provided with a system for stowing and handling the drilling rods.

It is also known the patent application CN202913951U in which is disclosed a power head and a rotary drilling rig with an adjustable pulley yoke center distance. The rotary drilling rig is mainly composed of a crawler belt chassis, an upper revolving vehicle, a main winch, a steel wire rope, a luffing mechanism, a mast, a pulley yoke, a drilling rod, the power head and a drilling bit, the power head is composed of a power head sliding frame, a connection board, a reduction gearbox and an adjusting device, a pin hole arranged on the adjusting device is respectively connected with the power head sliding frame and the connection board, the reduction gearbox is rigidly connected with the connection board, the pulley yoke is composed of a rear pulley yoke body, a rear pulley, an adjusting rod, a front pulley and a front pulley yoke body, one end of the adjusting rod is provided with a hole to be hinged with the rear pulley yoke body, the other end of the adjusting rod is provided with a first hole and a second hole to be connected with the front pulley yoke body, and the rear pulley yoke body, the adjusting rod and the front pulley yoke body are mutually hinged to form a triangle. According to the power head and the rotary drilling rig with the adjustable pulley yoke center distance, drilling diameter ranges of the drilling rig can be enlarged under the condition that the drilling depth is reduced, the drilling depth is increased under the condition that the drilling diameter is reduced, and drilling capacity ranges of the drilling rig are enlarged.

It is the object of the present invention to provide an assembly for driving excavating or drilling equipment for ground which overcomes all the drawbacks of the prior art.

According to the present invention, an assembly for driving excavating or drilling equipment for ground is provided.

Another aspect of the present invention relates to a system for changing the excavation centre-to-centre distance of an excavating machine.

A further aspect of the present invention relates to a machine for excavating ground through the use of drilling equipment.

Yet another aspect of the present invention relates to a method for changing the excavation centre-to-centre distance of an excavating machine.

BRIEF DESCRIPTION OF THE DRAWINGS

The features and advantages of the assembly, system, machine and method will become clear and apparent in the light of the following description of several possible embodiments and of the annexed drawings, which represent some different possible exemplary, but non-limiting, embodiments, wherein:

FIGS. 13A and 13B are side views of a head for the ropes, shown in different configurations as a function of the change in the excavation centre-to-centre distance; in particular, in FIG. 13A the head is in a retracted configuration; in FIG. 13B the head is in an extended configuration;

FIG. 14 shows a perspective view of a fixing system that can be used in the assembly for driving parts of drilling equipment according to the present invention.

DETAILED DESCRIPTION OF THE INVENTION

Figure 1:
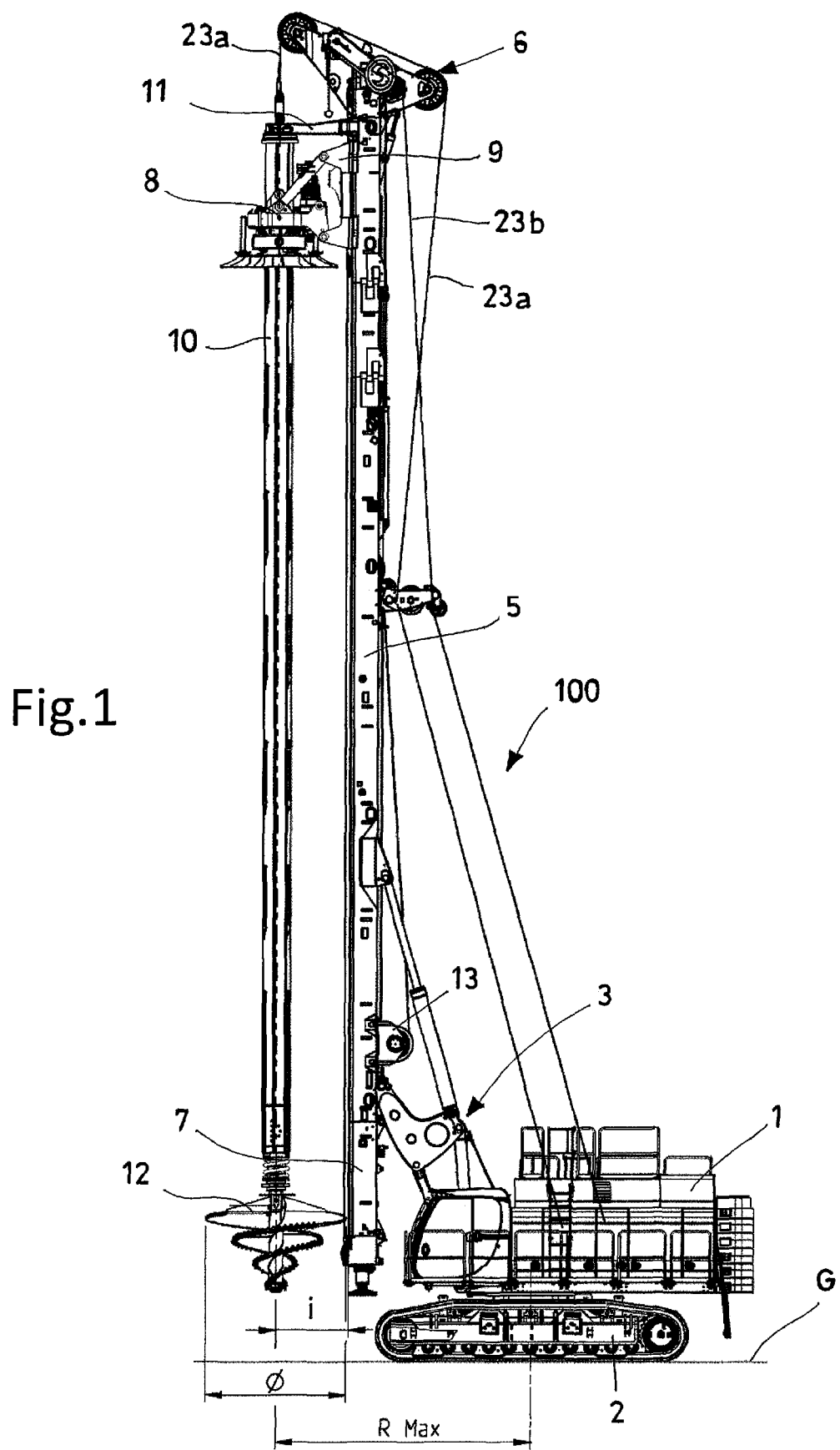
FIG. 1 shows a side view of an excavating machine according to the prior art, equipped with large-diameter excavating equipment mounted on a mast, wherein the size of the equipment is limited by the excavation centre-to-centre distance.
Figure 2:
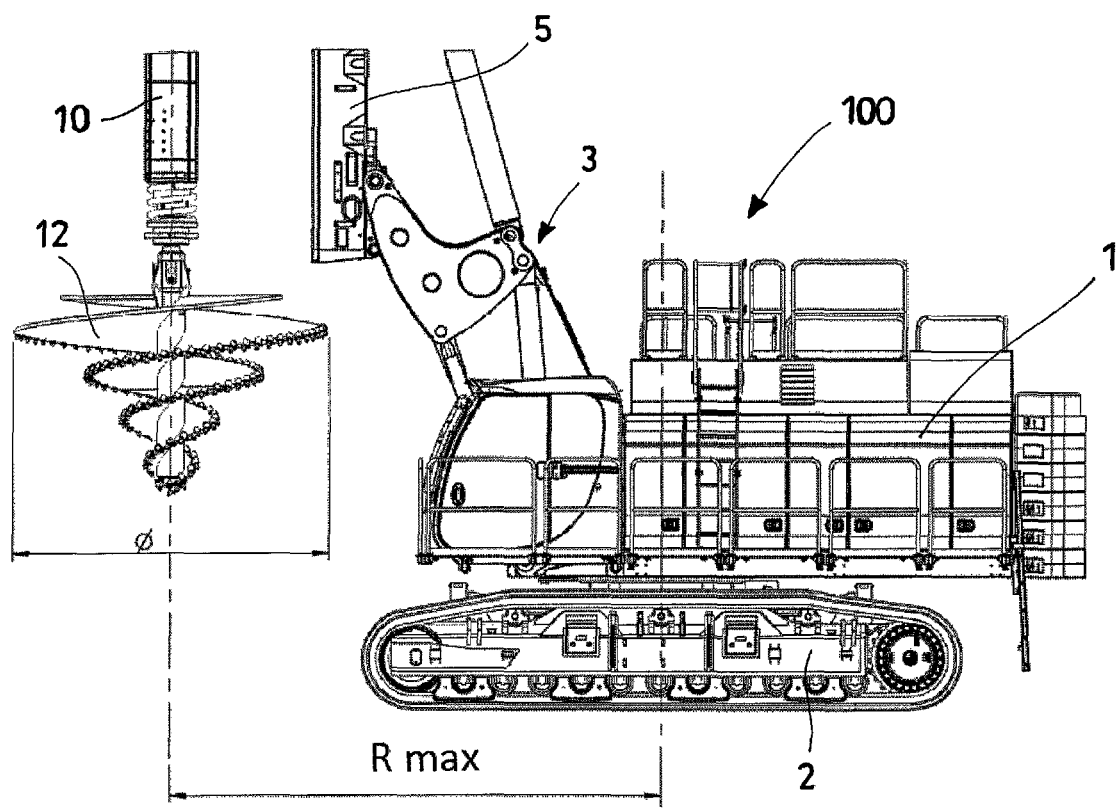
FIG. 2 shows a side view of an excavating machine according to the prior art, wherein the foot has been removed to allow for a longer excavation diameter, compared to the variant shown in FIG. 1.

With reference to the above-mentioned figures, the assembly according to the present invention is adapted to drive excavating or drilling equipment (10, 12) for ground "G". Said assembly is particularly suitable for implementation on an excavating or drilling machine 100, which may be either a specially designed machine or an existing machine in accordance with the prior art. For simplicity's sake, reference numeral 100 will be used throughout this description.

For the purposes of the present description, the term drilling equipment refers to one or more drill rods or kellies 10 and/or one or more excavating tools 12 connected to said one or more rods.

In general, the assembly according to the present invention comprises a drive assembly (110, 900) adapted to slide along a mast 5 of an excavating or drilling machine 100, for driving at least a part of drilling equipment (10, 12).

Said assembly also comprises at least one actuator (23, 13), which is configured for performing operative functions for driving parts of an excavating or drilling machine 100 or of drilling equipment (10, 12).

Drive assembly (110, 900) according to the present invention comprises a first structure or carriage (90, 111), in turn comprising guide members (92, 116, 115) adapted to allow it to slide along said mast 5.

Drive assembly (110, 900) according to the present invention further comprises a second support structure (80, 112) adapted for at least supporting drilling equipment (10, 12).

Said first structure or carriage (90, 111) and said second support structure (80, 112) are mutually movable relative to each other.

Said at least one actuator (23, 13) of the assembly according to the present invention is adapted for at least controlling the mutual movement of said first structure or carriage (90, 111) and said second support structure (80, 112).

Drive assembly (110, 900) of the assembly according to the present invention is capable of taking at least two operating configurations. In the different possible operating configurations of the drive assembly, there is a variation in the distance of said second support structure (80, 112) from said mast 5, particularly at least relative to an axis perpendicular to the axis of extension of said mast 5. The variation in the distance of said second support structure (80, 112) from said mast 5 allows the assembly according to the present invention to take at least two different excavation centre-to-centre distances (i1, i2).

In said at least two operating configurations of said drive assembly (110, 900), said first structure or carriage (90, 111) and said second support structure (80, 112) are mutually constrained, in particular in a rigid and direct manner.

In the assembly according to the present invention, between said first structure or carriage (90, 111) and said second support structure (80, 112) no additional elements, such as extensions, kinematic mechanisms, etc. are needed to allow the drive assembly to take the different operating configurations.

Moreover, in the assembly according to the present invention, while switching between the different operating configurations of drive assembly (110, 900), said first structure or carriage (90, 111) and said second support structure (80, 112) are always directly constrained to each other through at least one mechanical constraint.

In the assembly according to the present invention, said first structure or carriage (90, 111) and said second support structure (80, 112) are never unconstrained from each other; in fact, there is always at least one mechanical constraint between the structures.

Furthermore, in the assembly according to the present invention said at least one actuator (23, 13), in addition to controlling at least the mutual movement of said first structure or carriage (90, 111) and said second support structure (80, 112), is configured for carrying out further operative functions for driving parts of an excavating or drilling machine 100 or of the drilling equipment (10, 12).

The assembly according to the present invention allows the assembly to switch between the different operating configurations of the drive assembly by exploiting an actuator already present in the machine, which is already employed for other functions. Therefore, the present invention does not require the implementation of a dedicated actuator to allow changing excavation centre-to-centre distance "i".

In one possible embodiment of the assembly according to the present invention, for switching from a first configuration to a second configuration of the drive assembly (110, 900), the mutual movement of said first structure or carriage (90, 111) and said second support structure (80, 112) is effected by means of at least one rotary movement.

In one possible alternative and exemplary, but non-limiting, embodiment, for switching from a first configuration to a second configuration of the drive assembly (110, 900), the mutual movement of said first structure or carriage (90, 111) and said second support structure (80, 112) is effected by means of at least one linear movement.

In further possible exemplary, but non-limiting, embodiments, the mutual movement of said first structure or carriage (90, 111) and said second support structure (80, 112) may be a combination of rotary and/or linear and/or rotational-translational movements, according to specific requirements, e.g. a combination of a rotary movement and a linear movement, or a combination of rotary movements.

In general, depending on the implemented type of mutual movement of said first structure or carriage (90, 111) and said second support structure (80, 112), the type of mechanical constraint between the structure may vary and/or be a combination of mechanical constraints, such as hinge constraints and/or a slider-type constraint, e.g. a prismatic one.

For the purposes of the present description, a slider-type constraint is meant to be a constraint that allows translation in one direction, but no rotation.

By way of exemplary, but non-limiting, embodiment in case of a rotary movement the constraint may be a hinge constraint, whereas in case of a linear movement it may be a slider-type constraint; in case of hybrid movements, e.g. roto-translation, the mechanical constraint may be a combination of hinge and slider-type constraints.

Therefore, in the assembly according to the present invention, while switching between the different operating configurations of drive assembly (110, 900), said first structure (90, 111) and said second structure (80, 112) are constrained via at least one hinge and/or slider-type constraint, preferably prismatic in shape.

In one possible embodiment of the assembly according to the present invention, for switching from a first configuration to a second configuration of drive assembly (110, 900), the mutual movement of said first structure (90, 111) and said second structure (80, 112) is effected by means of at least two rotary movements. In the present embodiment, while switching between two different operating configurations of drive assembly (110, 900), said first structure or carriage (90, 111) and said second support structure (80, 112) are constrained by means of hinge constraints, wherein a first rotary movement occurs relative to a first hinge constraint and a second rotary movement occurs relative to a second hinge constraint.

The present solution allows changing, through two tilting movements, the distance of said second support structure (80, 112) from said mast relative to both an axis perpendicular to the axis of extension of said mast 5 and the very axis of extension of mast 5. Preferably, the radii of curvature of the rotary movements are selected in a manner such that the variation relative to the longitudinal axis of the mast is negligible compared to the variation relative to the axis perpendicular to the axis of the same mast 5.

It is thus possible to change the excavation centre-to-centre distance in a simple manner, even when said second structure (80, 112) has a considerable mass.

In a preferred exemplary, but non-limiting, embodiment, said first structure or carriage (90, 111) and said second support structure (80, 112) are constrained via removable pin-type fixing means (25a-25D, 21, 22) adapted to directly constrain said first structure or carriage (90, 111) and said second support structure (80, 112) in the different operating configurations.

Said pin-type fixing means are adapted to be inserted into suitable holes (93-96, 112, 113, 118-121) made in said first structure (90, 111) and said second structure (80, 112).

In general, said first structure (90, 111) or said second structure (80, 112) comprises at least two pairs of holes. In general, the position and number of holes may vary according to the implemented embodiment.

In said embodiment, a first pair of holes (95, 96) lie on a first circumference, e.g. having a radius "R1", and a second pair of holes (93, 94) lie on a second circumference, e.g. having a radius "R2".

Preferably, the centre of said first circumference is one of the holes of said second pair; and the centre of said second circumference is one of the holes of said first pair.

In such an embodiment, said first pair of holes and said second pair of holes lie at different heights relative to the longitudinal axis of said mast 5, so that, while making the two above-described rotary movements, the distance of said second support structure (80, 112) from said mast (5) will change with respect to the axis perpendicular to the axis of extension of said mast (5), so that at least two different excavation centre-to-centre distances (i1, i2) can be set.

In one possible embodiment of the assembly according to the present invention, for switching from a first configuration to a second configuration of drive assembly (110, 900), the mutual movement of said first structure (90, 111) and said second structure (80, 112) is effected by means of a linear movement. In such an embodiment, while switching between the different operating configurations of drive assembly (110, 900), said first structure (90, 111) and said second structure (80, 112) are constrained by means of at least one slider-type constraint, preferably prismatic in shape.

Said first structure (90, 111) or said second structure (80, 112) comprises at least one pair of holes. Said pair of holes lie on a straight line parallel to the direction of linear motion of the parts. Said pin-type fixing means are adapted to create a joint-type constraint.

In an advantageous embodiment of the assembly according to the present invention, said first structure or carriage (90, 111) and said second support structure (80, 112) are constrained to each other by means of pins; each pin is moved axially by a respective actuator 201.

The assembly according to the present invention is particularly suitable for being controlled by a control unit, e.g. a PLC installed either in the assembly or in the machine.

Said control unit may be a unit capable of controlling said actuators 201 and also capable of interfacing to the control unit of excavating or drilling machine 100 in order to control actuators of machine (13, 23).

Said control unit may be able to automate the movements of drive assembly (110, 900), thus ensuring a faster and safer change of excavation centre-to-centre distance. In general, implementing pin-type fixing means driven by an actuator allows increasing the safety level and reducing the operators' effort, resulting in shorter machine downtimes. Said control unit can control the driving of the pins and verify the positions thereof.

In general, in the assembly according to the present invention said at least one actuator (23, 13), adapted for at least controlling the mutual movement of said first structure or carriage (90, 111) and said second support structure (80, 112), can exert a force along one direction only, in the desired sense.

In the several possible embodiments of said at least one actuator (23, 13), it may be a rope, e.g. rope 23, associated with a hoist, e.g. the main or service hoist, or hoist 13 adapted to drive a carriage 90 for moving rotary 80.

Preferably, the rope and the hoist are already present in drilling machine 100 and are configured for performing other operative functions for driving parts of an excavating or drilling machine 100 or of drilling equipment (10, 12); in fact, said rope 23 may be the rope associated with the main hoist for moving the drilling equipment, or the one associated with the service hoist for moving drilling equipment.

Alternatively, the actuators in use may consist of any combination of a rope and a hoist already present in excavating machine 100 and intended for performing a function on the excavating machine as a primary function and, as a secondary function, controlling the movements between said first structure or carriage (90, 111) and said second support structure (80, 112) of drive assembly (110, 900) of the assembly according to the present invention.

In an alternative embodiment, said at least one actuator is a linear actuator.

Preferably, said linear actuator is at least one hydraulic, electric or pneumatic cylinder. Said linear actuator is an actuator already comprised in drilling machine 100, configured for carrying out operative functions for driving parts of an excavating or drilling machine 100 or of drilling equipment (10, 12) as a primary function and, as a secondary function, controlling at least the mutual movements of said first structure or carriage (90, 111) and said second support structure (80, 112). In one possible embodiment, said linear actuator is adapted to drive carriage 90 along mast 5, as an alternative to the use of hoist 13.

In general, said at least one actuator (23, 13) is fastened at one end to at least one portion of drilling machine 100, and is connected at the other end to at least one of said first structure or carriage (90, 111) or said second support structure (80, 112) or said excavating equipment (10, 12).

As a function of the different possible embodiments of the assembly, and in particular depending on the typology of the first structure or carriage (90, 111), e.g. whether or not it is equipped with a drive actuator along mast 5, or depending on said second support structure (80, 112), in particular its weight and/or its working position on mast 5 and/or the positioning characteristics on the same mast 5, said at least one actuator may be connected to one or more of said first structure or carriage (90, 111) or said second support structure (80, 112) or said excavating equipment (10, 12). Several possible exemplary, but non-limiting, embodiments thereof will now be described, which are applicable in a general sense.

In a first possible embodiment of the assembly according to the present invention, described herein by way of non-limiting example, said drive assembly 900 comprises a second support structure, which is a drill head or rotary 80.

In a second exemplary, but non-limiting, embodiment of the assembly according to the present invention, said drive assembly 110 comprises a second support structure, which is a central frame 112 comprised in a rod guide 110, to which drill rod or kelly 10 can be connected.

The different possible embodiments of the assembly, particularly as regards the actuator and the drive assembly, and in particular the connection and movement of the first structure or carriage and said second support structure, shall apply whether said second support structure is rotary 80 or central frame 112.

It must also be underlined that, in the embodiment wherein said second support structure is a drill head or rotary 80, the same rotary 80 can work in all of the operating configurations taken by drive assembly 900, in order to carry out an excavation or a drilling operation.

For the purposes of the present description, the term operating configuration refers to that operating configuration taken by the drive assembly in which the working axis of the support structure (80, 112) is parallel to the longitudinal axis of mast 5. For the purposes of the present description, the term working axis of support structure (80, 112) refers to the axis relative to which drilling equipment (10, 12) can move when it is associated with the second support structure, i.e. the axis of rotation of the drilling equipment.

In general, the conformation of the assembly according to the present invention allows the second support structure (80, 112) to perform the same functions in the different operating configurations of the drive assembly. Therefore, in the embodiment wherein the second support structure is rotary 80, the rigid and direct mutual constraint between rotary 80 and carriage 90 allows the same rotary to apply the same pull, push and rotation forces, with the same torque, in both of the operating configurations of drive assembly 900, when compatible with the stability of the same assembly and/or of excavating machine 100 whereon the assembly is applied.

The assembly according to the present invention is particularly suitable for being comprised in a system for changing excavation centre-to-centre distance (i) of an excavating machine 100.

In general, as previously specified, an excavating machine 100 adapted to comprise the assembly or the system according to the present invention comprises: a base machine (1, 2); a mast 5, the upper end of which comprises a head 6 for supporting the pulleys for the sliding of ropes (23*a*, 23*b*); and a rotary 80, to which an excavating tool 12 is secured by means of a drill rod or kelly 10.

The system or assembly for changing excavation centre-to-centre distance "i" comprises a first carriage (9, 90), to which said rotary 80 is secured, so that it can slide along said mast 5; and a second carriage (11, 111), in which said drill rod 10 is suitably housed, so that it can slide along said mast 5.

In the system according to the present invention, at least one of a first support structure (8, 80), in which said drill rod (10) can be suitably housed, and a second support structure (11, 112), in which said drill rod can be suitably housed (10), is comprised in an assembly according to the present invention.

Therefore, at least one support structure has the characteristics of the first support structure (80, 112) as previously defined herein.

Advantageously, the first support structure is so constructed as to be comprised in the assembly according to the present invention.

Even more advantageously, an assembly according to the present invention comprises both the first excavating equipment support structure (80) and the second excavating equipment support structure (112).

Therefore, in addition to the carriage adapted for moving the rotary, also other elements of drilling machine 100 must be adapted and moved in order to change excavation centre-to-centre distance "i", in particular in order to obtain the full configuration with an extended excavation centre-to-centre distance "i2".

In a preferred embodiment of the system for changing excavation centre-to-centre distance "i" of an excavating machine 100 according to the present invention, said head 60 comprises a drive mechanism (21, 63). Said drive mechanism is adapted to drive pulleys 62. Said mechanism is also adapted to allow pulleys 62 to change position, particularly with respect to an axis perpendicular to the axis of extension of said mast 5.

The movement of said pulleys 62 caused by the drive mechanism (21, 63) is a movement in accordance with the movement of said assembly, between the different operating configurations of drive assembly (110, 900).

The drive mechanism allows adjusting the exit position of main rope 23*a*, which must be located either at an excavation centre-to-centre distance "i1" or at excavation centre-to-centre distance "i2" relative to mast 5.

Such variation can be obtained in a simple and known manner, e.g. by installing the front pulley in a more forward position by a distance "d"; therefore, the head has at least one pair of holes at a distance "d" from each other.

In an alternative embodiment, it is possible to install in the same hole a pulley having a bigger diameter. In such an embodiment, the groove diameter of a pulley for working at excavation centre-to-centre distance "i2" will show an increase, compared to the pulley for excavation centre-to-centre distance "i1", amounting to twice value "d" of the difference between the two excavation centre-to-centre distances (i1, i2).

FIG. 13*a* shows a head assembly 60, wherein on main frame 61 a pulley 62 is mounted, on which rope 23*a* of the main hoist is laid and ends up vertically at the excavation axis corresponding to an excavation centre-to-centre distance "i1".

The pulley is fixed to main frame 61 by means of a removable pin 28.

By removing pin 28 it is possible to insert an adapter frame 63, whereon the same pulley 62 is mounted, with the same pin 28, in a more forward position than the previous one, by a distance "d", as shown in FIG. 13*b*. The frame is fixed, by means of a second pin 29, to the structure of main frame 61, and the structure rotates about pin 29. The axis of pin 29 may not coincide with the hole in which the pin 28 was originally fixed in the retracted centre-to-centre distance position, shown in FIG. 13*a*. When rotation is complete, said structure abuts on the frame in proximity to the abutment plane 30.

The abutment condition may be locked by means of a removable fastener, e.g. screws, pins, plugs, or frame 63 may be allowed to swivel about pin 29.

By using the main hoist and providing rope 23*a* with an abutment element, it is possible to raise adapter frame 63 about pin 29, so as to overturn it and, in a second variant, leave it installed when switching again to the retracted centre-to-centre distance configuration shown in FIG. 13*a*.

Rope 23*a* of the main hoist will thus be at a distance from the guides equal to "i2", corresponding to the extended excavation centre-to-centre distance.

The system according to the present invention allows an excavating machine 100 to be set to at least two excavation centre-to-centre distances (i1, i2).

The system and/or the assembly according to the present invention are particularly suitable for being comprised in an excavating machine 100 for excavating ground by means of drilling equipment (10, 12).

Excavating machine 100 according to the present invention comprises: a rotating tower 1, in turn comprising: a base frame connected to an undercarriage 2; and a mast 5, the upper end of which comprises a head 6 for supporting pulleys 6 for the sliding of ropes (23*a*, 23*b*).

The assembly, system and machine according to the present invention allow solving all the problems of the prior art mentioned in the present patent application, as well as many others.

The following will describe more in detail, with reference to the annexed drawings, several possible embodiments of the assembly according to the present invention and of the system and excavating machine 100 whereto they are applied.

Figure 3:
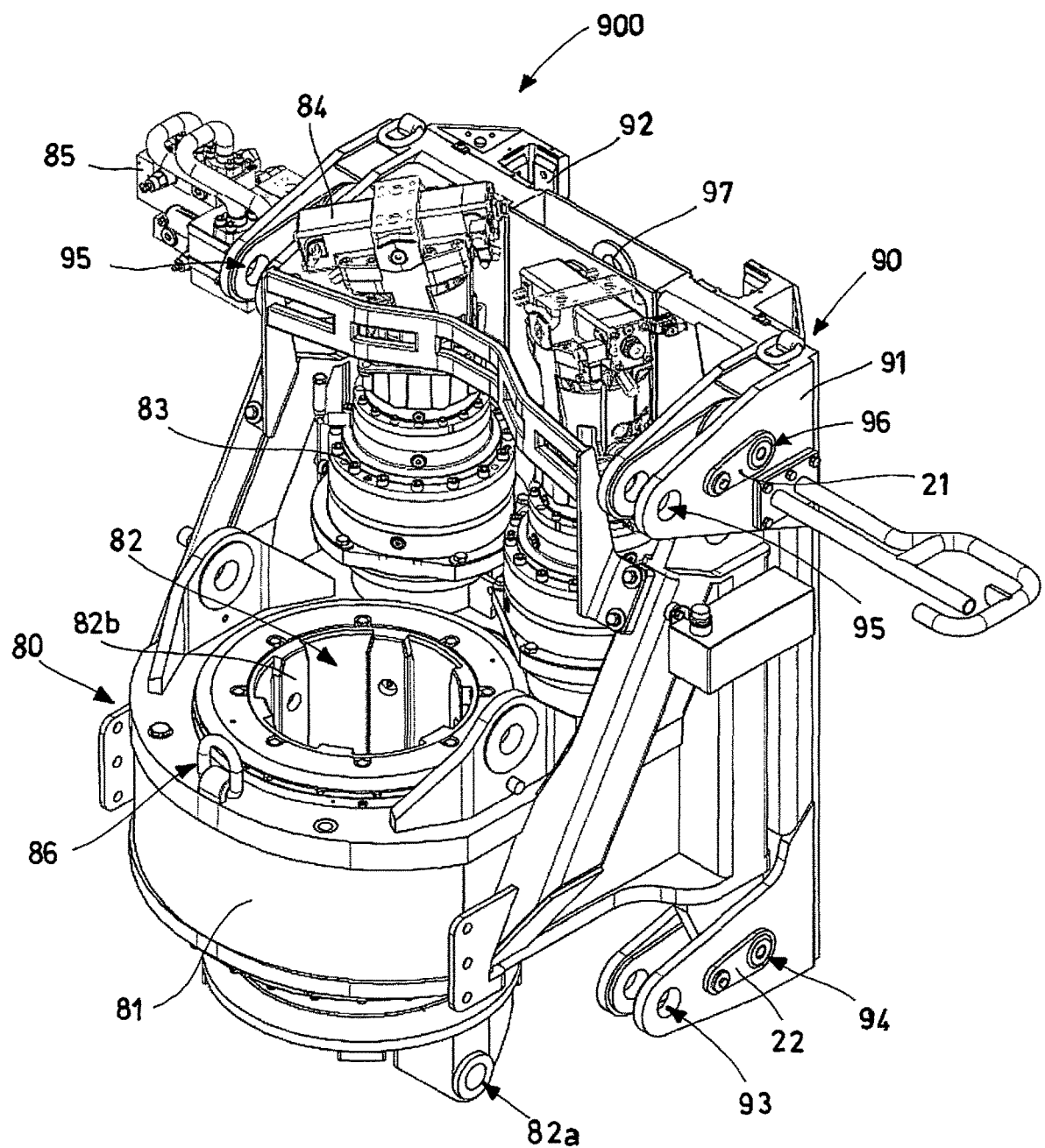
FIG. 3 shows a detailed perspective view of a first embodiment of the drive assembly included in an assembly for driving according to the present invention, wherein a rotary is associated with a first structure or carriage, according to the present invention, in a first operating configuration, or retracted configuration.

FIG. 3 shows, by way of non-limiting example, a first drive assembly 900 comprised in a first embodiment of the assembly according to the present invention. Said drive assembly 900 is adapted to allow rotary 80 to move along said mast 5, while allowing changing the excavation centre-to-centre distance at which rotary 80 can work. The drawing shows a rotary 80 having the technical characteristics already illustrated above, and a carriage 90 whereon rotary 80 is installed. In the present embodiment, in the operating configurations taken by said drive assembly 900, carriage 90 and rotary 80 are mutually constrained in a rigid and direct manner through a pin-type connection.

For illustrative, but non-limiting, purposes, rotary 80 comprises a fabricated body or base reducer 81 and coupling means for toothed wheels and at least one bearing for keeping quill 82 aligned with the excavation axis. Quill 82 is the rotary element used for transmitting the excavation forces, in particular the drilling torque. Quill 82 has an elongated tubular shape, and is fitted with abutment ledges 82b engaging with matching ledges of the drill rods or kellies for transmitting the torque and the pull/push forces, e.g. in case of friction-type rods. In the case of drilling by means of mechanically locked kelly rods, the horizontal tracts of the ledges, both the upper and the lower ones, are used as mechanical stops for the extraction pull force and for the push force exerted on rod 10. At the bottom, with reference to a vertical axis, quill 82 may have additional fixing elements for motion transmission, e.g. holes 82a, at least one pair thereof, arranged symmetrically relative to the excavation axis defined by rotary 80. To such holes 82a other devices useful for the excavation activity are connected, e.g. a cardan joint to which the drill pipe is connected, which is adapted to receive the rotary motion and the axial motion of insertion into and extraction from quill drive 82. Rotary motion is imparted to quill 82 by at least one motor or moto-reducer assembly, preferably hydraulically controlled. FIG. 3 shows a preferred, but non-limiting, architecture, in which a pair a mechanical reducers 83 and a pair of variable-displacement motors 84 are installed. Several different alternative and equivalent configurations are also known in the industry, such as: a single moto-reducer assembly, one or more large-displacement hydraulic motors directly connected without the interposition of a reducer, fixed-speed or shiftable reducers, final reduction stage inside single-stage base reducer 81, dual stage reducer, e.g. with a gear change. Alternatively to rotaries 80 comprising an oil-pressure power unit, rotaries are also known in the industry which can be driven by electric motors, e.g. direct-current, alternating-current, permanent-magnet motors or the like.

In the embodiment shown in FIG. 3, carriage 90, according to the present invention, has a main portion 91, which is so shaped as to comprise guiding or backing members 92 adapted to guide carriage 90 along mast 5. In the present embodiment, said guide members 92 are adapted to slide along prismatic guides provided on mast 5. Such guiding or backing members 92 comprise abutment portions, e.g. ledges made of plastic material or bronze for reducing the coefficients of friction along mast 5, or may consist of rolling elements, e.g. rollers with bushings or bearings for further reducing frictions.

In general, said mast 5 comprises a pair of guides arranged parallel to each other at a predetermined distance.

In a preferred, but non-limiting, embodiment, said guide members are so shaped as to comprise at least three abutment portions for each guide comprised in mast 5. In particular, said abutment portions are a front one, a rear one and a lateral one, so as to guide carriage 90 on three sides along each guide comprised in mast 5. Preferably, said guide members are so designed as to comprise abutment portions acting upon each guide of mast 5 in at least two distinct zones of the same guide spaced apart from each other.

Figure 4:
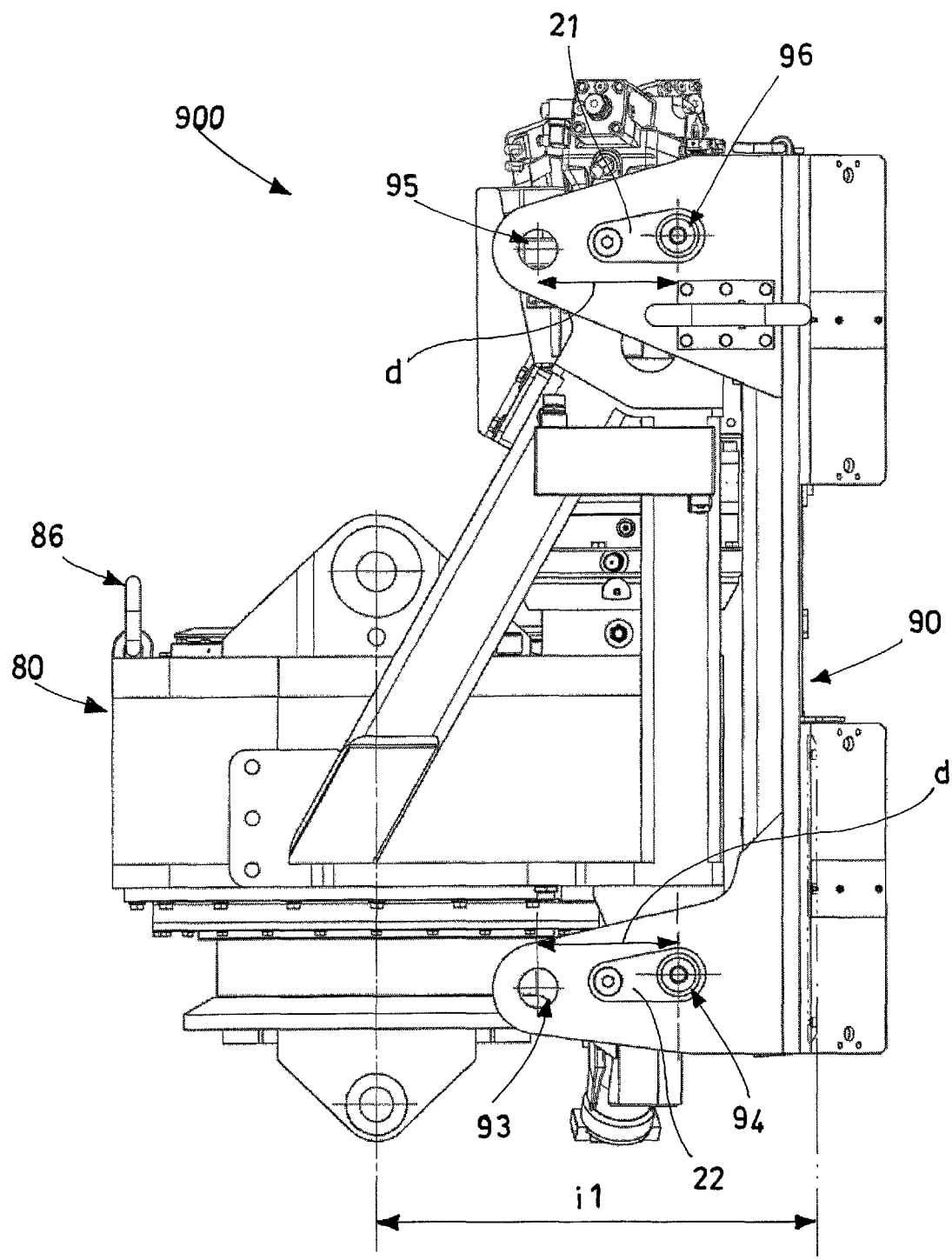
FIG. 4 shows a side view of the first drive assembly included in an assembly according to the present invention as shown in FIG. 3, in a first operating configuration, or retracted configuration.

In the embodiment shown in FIGS. 3 and 4, it can be understood that mast 5 comprises at least two parallel guides, and therefore said guide members 92 are abutment portions acting upon both guides of mast 5. Advantageously, these abutment portions can be short, and therefore, for each guide of mast 5, the guide members 92 are so designed as to comprise abutment portions located at the upper and lower ends of carriage 90, with reference to the longitudinal extension of the guide. In the embodiment shown in FIGS. 3-8, it can be understood that the number of abutment portions is twelve.

In general, the shape of guide members 92 will depend on the shape of the guides comprised in mast 5. In fact, in case of cylindrical guides, the corresponding guiding or backing members 92 comprised in carriage 90, according to the present invention, will be provided in the form of bushes or portions of a cylindrical sector, or a pair of rollers oriented at 45° or a plurality of rollers, e.g. three rollers arranged at 90°.

In one possible exemplary, but non-limiting, embodiment, carriage 90, and in particular main portion 91, supports the hydraulic block 85 that supplies power to motors 84 and/or the system that controls the logics of operation. Hydraulic block 85 receives the tubes coming from rotating tower 1, which carry pressurized oil for supplying the power required for the rotation of rotary 80.

As an alternative, hydraulic block 85 may be connected directly to rotary 80, being removable by means of screws or pins, and/or having flanged, screwed or quick-coupling, whether single or plate-type ones, tube connections.

In the illustrated embodiment, said fabricated body 81 of rotary 80 comprises a plurality of crosspieces, appropriately arranged, in particular in such a way as to form two substantially triangular structures, e.g. forming an "A" shape, adapted to surround rotary 80, and in particular the circular structure of fabricated body 81, on two sides.

FIGS. 3 and 4 show one possible embodiment of drive assembly 900 in a first operating configuration, wherein excavation centre-to-centre distance "i" is at its minimum value.

Describing more in detail one possible embodiment of drive assembly 900 according to the present invention, e.g. as shown in FIG. 4, in the upper portion of drive assembly 900, with reference to a vertical axis, there is a pin 21 that connects carriage 90 to the rotary, wherein rotary 80 is in a first position, corresponding to the first or retracted operating configuration of drive assembly 900. In particular, said pin 21 is inserted in a first upper hole 96 comprised in carriage 90. In this configuration, excavation centre-to-centre distance "i" of rotary 80 is at its minimum value "i1". Under pin 21, still with reference to FIG. 4, there is a pin 22 that connects rotary 80 to carriage 90 in the same position corresponding to the first or retracted operating configuration. Specularly, on the other side of carriage 90, not visible in FIG. 4, pins 21 and 22 are installed in as many holes (96, 94) at the top and bottom. In this operating configuration there are four connection points, in particular four holes (94 and 96), two per side, in which as many pins (21 and 22) are inserted. Alternatively, the pins may be just two, one at the top and one at the bottom, and be sufficiently long to enter through the holes provided on both sides. It is clear that in the portion of fabricated body 81 of rotary 80 there are holes into which pins (21, 22) can be inserted in order to rigidly secure rotary 80 to carriage 90 in said operating configurations.

In the configuration illustrated in FIGS. 3 and 4, the connection protuberances or brackets comprised in carriage 90 define the female portion of a fitting, into which the triangular structures of the fabricated body that support rotary 8 can be fitted. Such triangular structures define the male portion of the fitting. Pin 21 connects holes 96 and pin 22 connects holes 94 of carriage 90, in alignment with the corresponding ones that are present on the structure of rotary 80.

Likewise, the parts may be coupled together by reversing the male and female types of the fitting portions between rotary 80 and carriage 90, or by using a mixed configuration, while keeping the characteristics of the present invention unchanged. As a further alternative, rotary 80 and carriage 90 comprise each a single section into which the pin can be inserted.

Holes 94 and 96 of carriage 90 are arranged at a distance from each other, with reference to an axis parallel to the longitudinal axis of mast 5 along which carriage 90 slides, so as to achieve a maximum possible distance, compatible with the extension in length of carriage 90. This feature allows reducing the loads acting upon pins (21, 22), so that the latter can be sized favourably in the design phase.

In particular, upper holes 96 are located in proximity to the top end of carriage 90, whereas lower holes 94 are located in proximity to the bottom end of carriage 90.

Continuing the description of the first embodiment shown in FIGS. 3-8, a second pair of holes 93 and 95, e.g. visible in FIGS. 3 and 4, which illustrate the left side of carriage 90, are spaced apart from the corresponding holes 94 and 96 by the same distance, equal to the necessary increase in excavation centre-to-centre distance "i" in an extended configuration, at least with respect to an axis perpendicular to the axis of extension of said mast 5. As already pointed out, holes (93-96) are present on both sides of carriage 90.

Advantageously, holes 93, 94, 95, 96 have the same diameter, so that similar and interchangeable pins (21, 22) can be used. In different variants, the holes have different diameters, e.g. the diameter of upper holes 95 and 96 is different from that of lower holes 93 and 94. This variant implies that pins (21 and 22) must be different from each other. In a much less preferred, though possible, manner, the holes have different diameters, thus requiring their own specific pin. This will avoid any mistakes when assembling carriage 90 and rotary 80 between the different operating configurations. Reduction bushings may possibly be available, to be inserted into the holes in order to adapt the size of pin (21, 22) to that of hole (93-96).

FIG. 4 shows a side view of a first embodiment of drive assembly 900 according to the present invention, wherein a rotary 80 is connected to the carriage 90. FIG. 4 shows drive assembly 900 in a first operating configuration, or retracted configuration, in which excavation centre-to-centre distance "i" is at its minimum value "i1".

In this operating configuration, pins 21 and 22 are connected in holes 96 and 94, which are closer to guiding or backing members 92, and therefore to the guides comprised in mast 5, so that the excavation centre-to-centre distance "i" is at its minimum value "i1". When the assembly is applied to an excavating machine 100, this first operating configuration ensures the utmost stability of excavating machine 100 and lower loads on the structures, especially on mast 5, the performance being equal.

Hole 95 lies at a distance "d" from corresponding hole 96. By the same distance "d" also hole 93 is spaced apart, along the axis perpendicular to the longitudinal extension of mast 5, from hole 94.

Figure 5:
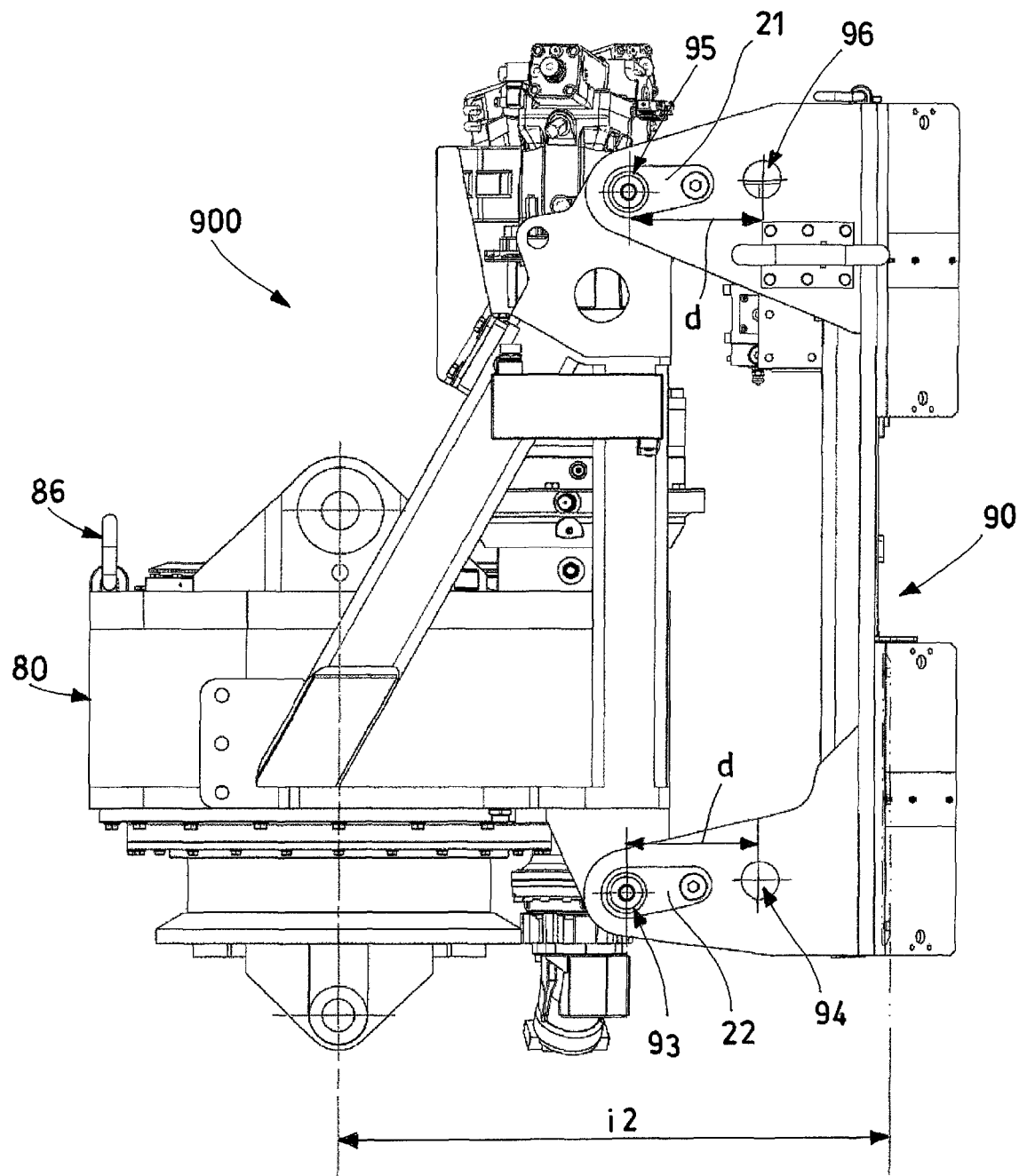
FIG. 5 shows a side view of the first embodiment of the drive assembly included in an assembly according to the present invention, in a second operating configuration, or extended configuration.

FIG. 5 shows drive assembly 900 in a second operating configuration, in which rotary 80 is mounted on carriage 90 in a second position corresponding to an extended centre-to-centre distance "i2". This position is obtained by arranging rotary 80, in particular the triangular portion of fabricated body 81, and in particular the fixing holes thereof, so that it matches those holes (93, 95) on carriage 90 that are farther from guiding or backing members 92, and therefore from the guides comprised in mast 5, on both sides of drive assembly 900.

In this second position, excavation centre-to-centre distance "i2" will be longer, and in particular equal to:

$$i2 = i1 + d.$$

The increased excavation centre-to-centre distance "i" allows the installation of excavating tools having a bigger diameter Ø, and these can also be placed in the front part of mast 5. Of course, this configuration involves higher stress on the structures, including carriage 90 itself, mast 5, linkage 3 and rotating tower 1.

As previously explained, the means for driving rotary 80, and therefore carriage 90, may be of different types. In the one represented in FIG. 3 there is a hole 97, located in the upper region of carriage 90, into which a pin can be inserted, to which a linear actuator can be fastened. Said linear actuator, e.g. a hydraulic cylinder, or equivalent devices, is adapted to impart the pull and push forces to said carriage 90. The actuator in use is per se known. In general, said actuator is connected at one end to carriage 90 and at the other end to mast 5, e.g. in the front part of the same. In an alternative embodiment of the actuator a pulley is used. Said transmission pulley is received in the housing formed on main structure 91 of carriage 90. A rope of the pull branch is run in the upper transmission pulley in the carriage and returns in proximity to the upper part of mast 5, preferably secured in head 6 in order to exert a double-tackle multiple extraction pull on the carriage and the rotary. Motion is imparted to the rope by a hoist 13 called pull-down hoist. This hoist is preferably arranged on mast 5. Likewise, on main structure 91 of carriage 90, specularly to the upper pulley, there may be a second pulley, located at the bottom, in which the rope of the push branch of hoist 13 is run.

Equivalent embodiments are known which utilize different types of multiple pulls with different numbers of tackles, e.g. the connection of the ropes may be direct, without a transmission pulley, or the push hoist may be connected above or under drive assembly 900 and the rope may come out from such hoist directed downwards to exert the thrust on the carriage. Alternative implementations of the actuator are also known, such as, for example, the use of other equivalent devices with pinions and a rack, although more expensive and delicate and less powerful in terms of force/speed ratio. Another possible embodiment of said actuator uses a moto-reducer with a closed-loop chain. Such chain is connected at both ends on carriage 90, so that the moto-reducer will, by reversing the direction of rotation, either pull or push carriage 90.

In general, in the second operating configuration, or extended configuration, the fixing between carriage 90 and rotary 80 is effected in the same way as in the first operating configuration, being in particular effected by means of pins and being thus equally rigid and precise.

Figure 6:
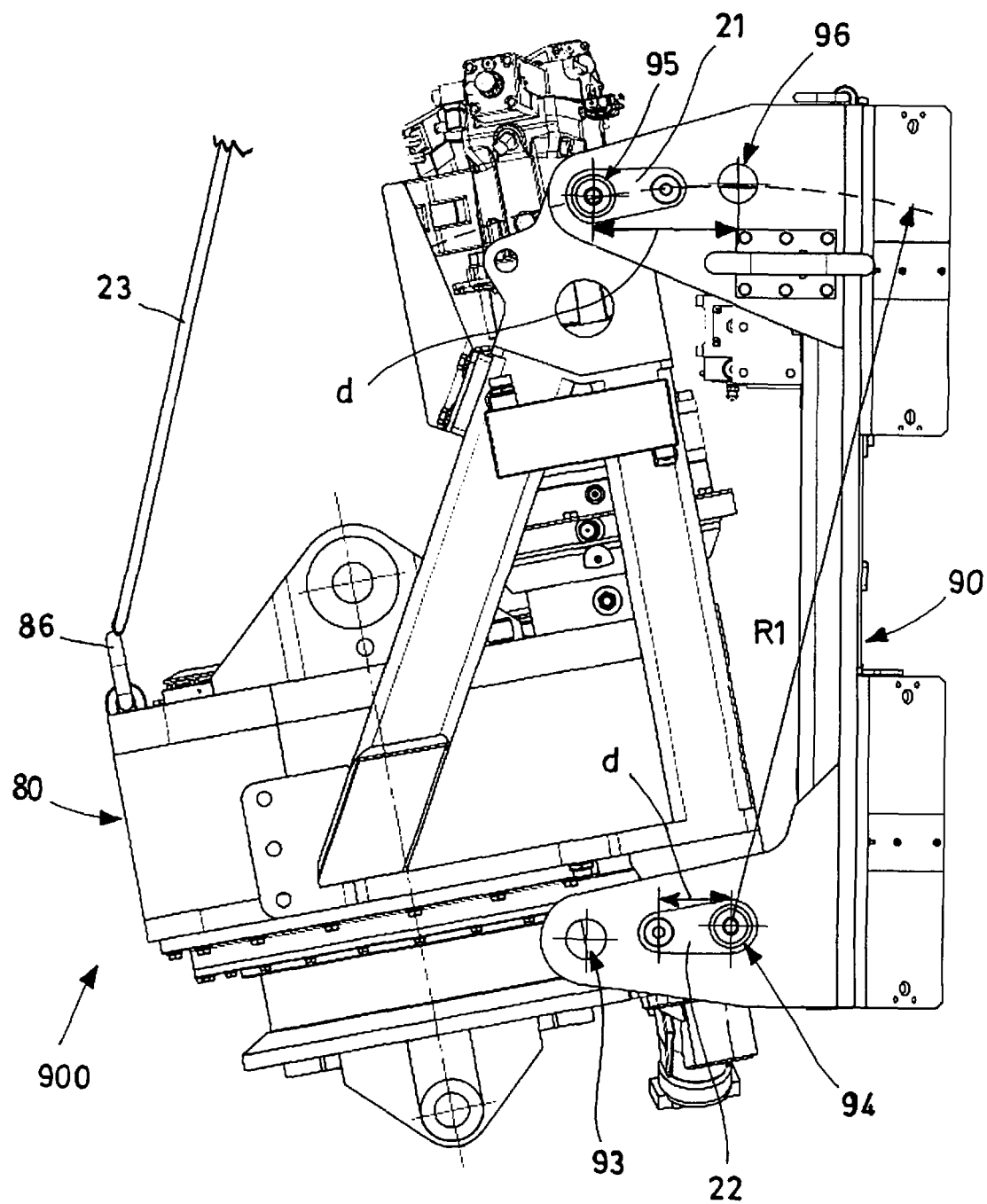
FIG. 6 shows a side view of the first embodiment of the assembly according to the present invention, illustrating the first drive assembly, as in FIG. 3, in an intermediate configuration between the first operating configuration, or retracted configuration, shown in FIG. 4, and the second configuration, or extended configuration, shown in FIG. 5.

FIG. 6 shows an intermediate condition of drive assembly 900, in particular between the first operating configuration, or retracted configuration, in which excavation centre-to-centre distance "i1" is shorter, as shown by way of example in FIG. 4, and the second operating configuration, or extended configuration, in which excavation centre-to-centre distance "i2" is longer, as shown by way of example in FIG. 5.

As previously specified, in the assembly according to the present invention, an actuator already employed for other functions of an excavating machine is used for effecting the mutual movements of said carriage 90 and said rotary 80, e.g. a rope with a hoist or a linear actuator already present on excavating machine 100. Such a solution allows working in a simple and safe manner without requiring any auxiliary driving devices.

In one possible embodiment, one of the two hoists already present on excavating machine 100 may be used, e.g. either the main hoist or the service hoist, without distinction.

Referring back to the conformation of drive assembly 900, in one possible and preferred embodiment upper holes 95 and 96 of carriage 90 are situated along the circumference having as a centre one of the other two lower holes (93, 94); in particular, in the embodiment shown in the drawings upper holes 95 and 96 are located along the circumference having as a centre hole 94. The circumference having a radius "R1" has hole 94 as a centre and passes through the centres of holes 96 and 95. The position of the holes is invariant along the circumference, since the fundamental characteristic is that the distance between the two centres of holes (95, 96) is equal to that of lower holes (93, 94), i.e. equal to "d".

In the illustrated embodiment, upper hole 96 is vertically aligned with hole 94, thus moving forward the excavation centre-to-centre by distance "d"; the point where rotary 80 is fixed to carriage 90 drops by a negligible value compared to distance "d", because hole 95 lies on the circumference having radius "R1".

In one possible variant, instead of having lower holes 94 and upper holes 96 aligned along the vertical, the drive assembly may have upper holes (95, 96) in symmetrically opposite positions relative to the vertical joining line passing through the centre of hole 94. Since hole 96 lies on the right side of the vertical, in particular at a distance d/2 from the vertical, and hole 95 lies on the left side of the vertical, at a distance d/2 from the vertical, a symmetrical condition is obtained in which there is no vertical movement of rotary 80 when switching between the different operating configurations of drive assembly 900, in particular from retracted centre-to-centre distance position "i1" to extended centre-to-centre distance position "i2".

In a similar and specular manner, all that has been illustrated with regard to holes 95 and 96 also applies to holes 93 and 94. In particular, as shown by way of example in the embodiment of the annexed drawings, holes 93 and 94 are located along a circumference having as a centre the centre of hole 95 and a radius R2. Being the distance between the centres of holes 95 and 93 equal to that between the centres of holes 95 and 94, in a preferable embodiment it is obtained that R1=R2.

In general, the method for changing an excavation centre-to-centre distance "i" of an excavating machine 100 according to the present invention, comprising at least one assembly adapted to drive drilling equipment (10, 12) according to the present invention, requires the execution of specific steps that allow switching between the different operating configurations while still maintaining a mechanical constraint between said first structure or carriage and said second support structure.

In the light of the different possible embodiments of the assembly according to the present invention, the method can be generalized to encompass all the different possible implementations. In general, the method according to the present invention comprises the following steps:

removing at least two pin-type fixing means that constrain a first structure or carriage (90, 111) and said second support structure (80, 112) of a drive assembly (110, 900);

mutually moving said first structure or carriage (90, 111) and said second support structure (80, 112), so as to switch from a first configuration to a second configuration, controlling the movement by means of at least one actuator (23, 13);

constraining again said first structure or carriage (90, 111) and said second support structure (80, 112) by means of said at least two pin-type fixing means.

In the embodiment wherein the mutual movement of said first structure or carriage (90, 111) and said second support structure (80, 112) is of the rotary type; and in particular in the embodiment wherein said first structure or carriage (90, 111) and said second support structure (80, 112) are mutually constrained in the different configurations through first pin-type fixing means (21), adapted to define a first constraining axis, and second pin-type fixing means (22), adapted to define a second constraining axis, specific consecutive steps are required. In particular, for switching from a first operating configuration to a second operating configuration of drive assembly (110, 900), the following successive steps are carried out:

removing the first pin-type fixing means (21), thereby releasing a first constraint;

mutually moving said first structure or carriage (90, 111) and said second support structure (80, 112), so as to switch from a first operating configuration to an intermediate configuration, turning about said second constraining axis;

constraining again said first structure or carriage (90, 111) and said second support structure (80, 112) by means of said first pin-type fixing means;

removing said second pin-type fixing means, thereby releasing a second constraint;

mutually moving said first structure or carriage (90, 111) and said second support structure (80, 112), so as to switch from said intermediate configuration to a second configuration, turning about said first constraining axis;

constraining again said first structure or carriage (90, 111) and said second support structure (80, 112) by means of said second pin-type fixing means.

In this implementation of the method, in order to switch from a first operating configuration, e.g. the retracted configuration, to a second operating configuration, e.g. the extended configuration, two rotary or tilting movements are necessary by turning about constraining axes. Such a solution is particularly suitable for application in embodiments wherein the second support structure (80, 112) has a considerable mass, at least greater than the mass of the first structure or carriage (90, 111), e.g. in the embodiment wherein said second support structure is a drill head or rotary 80. Anyway, this sequence of steps can be implemented also for other embodiments of the assembly, in particular of the drive assembly.

The method according to the present invention can be automated. For example, it may be implemented, at least partially, by means of a control unit. Said control unit is adapted to appropriately activate one or more actuators and/or to receive data from sensors for the purpose of executing and/or controlling, at least partially, one or more steps of the method according to the present invention. In one possible exemplary, but non-limiting, embodiment, said control unit is the control unit of excavating machine 100. Said control unit is adapted to allow and/or control the execution of one or more steps of the method.

As an alternative, said control unit is a control unit remote from the assembly, system and/or excavating machine 100 according to the present invention.

With reference to the specific embodiment shown by way of non-limiting example in FIGS. 3-8, in order to allow the mutual movement of rotary 80 and carriage 90 it is necessary to carry out a number of steps, such as, for example, connecting one end of a rope 23 of one of the two hoists to rotary 80 at a connection point. Said connection point preferably does not lie in any one of the planes that join holes 94 and 96 or 95 and 93 on both sides of drive assembly 900. Preferably, the connection point is located at that end of the rotary which is farther from carriage 90. In a first configuration, rotary raising point 86 is only one and is positioned in the upper part of rotary 80 itself, so that it can be directly reached by the ropes descending from head 6 of mast 5. As already described, it is possible to use other holes or multiple hooks and connection points at the same time.

In order to allow the switching between the different operating configurations, and in particular from the first operating configuration, or retracted configuration, to the second operating configuration, or extended configuration, e.g. via an intermediate configuration, it is necessary to remove pin 21 in order to release a first constraint.

In light of the possible arrangements of holes (93-96), and since the centre of gravity of drive assembly 900 is eccentric relative to the fixing points that connect carriage 90 to rotary 80, rotary 80 will tend to rotate under its own weight, thereby promoting the movement, when the mast is in the vertical condition. Therefore, in order to cause rotary 80 to turn about pin 22 fixed in hole 94, it is sufficient to remove pin 21 from hole 96 and release rope 23. During the rotation, hole 95 is clear. When the centres of the holes comprised in carriage 90 and rotary 80 are aligned, pin 21 can be inserted again into hole 95. This is because holes 95 and 96 advantageously have the same diameter.

Once pin 21 has been re-inserted, an intermediate configuration is reached wherein carriage 90 is again rigidly and directly connected to rotary 80.

During this movement, the only function performed by the actuator of the assembly according to the present invention, was to control the mutual movement of said carriage 90 and said rotary 80. In fact, in the present embodiment the force that allows the mutual movement of carriage 90 and rotary 80 is the weight force acting upon rotary 80.

In order to find the correct position, it is also possible to use video cameras, or locator means, whether removable ones to be temporarily installed during the movement stages or permanent ones, preferably adjustable, fixed to the structure. The locator on hole 96 is adjusted with pin 21 inserted in hole 96. The locator on hole 95 is adjusted with pin 21 on the hole 95. Once the outermost positions have been adjusted, it is possible to carry out the rotations of rotary 80 on carriage 90 by simply coming in abutment. The locators may be common devices with screw-type adjustment, or locking-hat, key-type or hydraulic devices, or ties, e.g. ropes and chains, the length of which is adjusted to allow the required arc of rotational movement.

Advantageously, pins 21 and 22 have a tapered point that facilitates the insertion of the pin and does not require a precise alignment of the holes.

When one wants to switch from the intermediate configuration to the first configuration, i.e. to make a reverse movement compared to the one described above, e.g. to turn rotary 80 clockwise in order to insert pin 21 into hole 96 again, it is possible to pull rope 23 by winding it on the hoist, activating said at least one actuator of the assembly according to the present invention. During this movement, the actuator of the assembly according to the present invention is adapted to carry out, and not only control, the mutual movement of said carriage 90 and said rotary 80.

In a second drive variant, the hoist that exerts tension on rope 23 is not moved, but a longitudinal movement is exerted on carriage 90 by the means that drive the carriage itself along mast 5, e.g. hoist 13 or the pull-down cylinder or other equivalent means fixed to carriage 90 for exerting forces on the carriage in the longitudinal direction of mast 5 and for exerting pull and/or push forces on rotary 80.

In such an embodiment of the assembly according to the present invention there are two actuators which, in addition to controlling the mutual movement of said first structure or carriage (90, 111) and said second support structure (80, 112), are both configured for carrying out further operative functions for driving parts of an excavating or drilling machine 100, as previously specified. In this case, an actuator, and in particular rope 23 connected to a hoist, is adapted to control the movement of drive assembly 90 between the various configurations, while the other actuator, normally adapted to drive carriage 90 along mast 5, is adapted to exert a force that allows the mutual movement of carriage 90 and rotary 80. In fact, by lowering carriage 90 along mast 5, since rope 23 is connected to connection point 86 and locked, rotary 80 is made to turn about pin 22, which is fixed to hole 94, by dropping carriage 90 whereon hole 94 is present.

Figure 7:
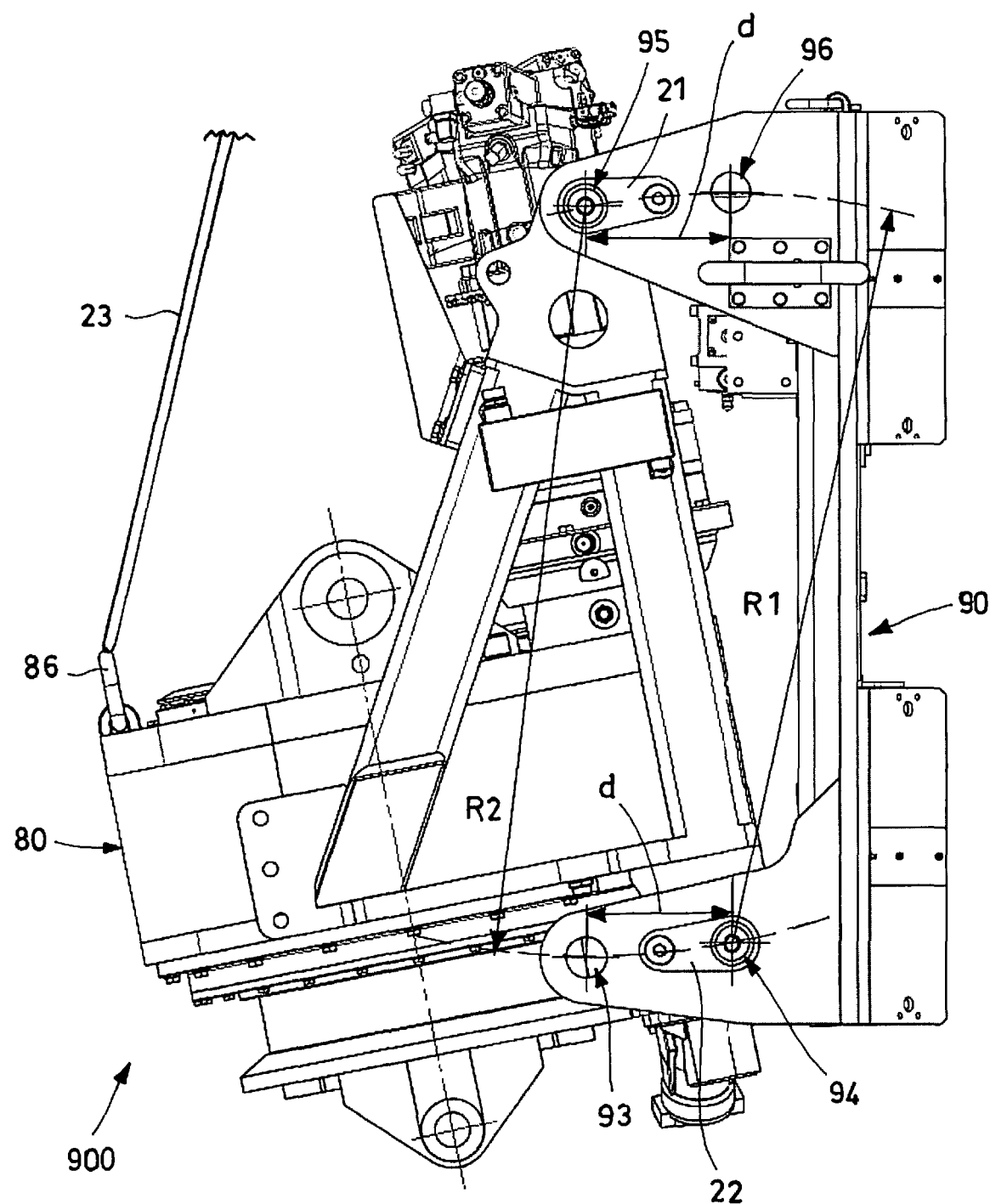
FIG. 7 shows a side view of the drive assembly as in FIG. 6, wherein further aspects of the invention can be identified.

FIG. 7 shows the intermediate configuration of the drive assembly, between the first configuration, or retracted configuration, and the second configuration, or extended configuration. This intermediate configuration is the starting position of the next step, wherein the movement of rotary 80 from the position with a retracted centre-to-centre distance to the position with an extended centre-to-centre distance, and vice versa, is completed.

In order to continue the switching between the different operating configurations, and in particular from the first operating configuration, or retracted configuration, to the second operating configuration, or extended configuration, e.g. in order to switch from the intermediate configuration to the second operating configuration, it is necessary to remove pin 22 in order to release a second constraint. By removing pin 22 from hole 94, a second constraint will be released and it will be possible to mutually move said carriage 90 and said rotary 80.

For example, by exerting a pull force on rope 23 it is possible to raise rotary 80. Rotary 80 will turn about pin 21 fixed in hole 95, and consequently the hole on rotary 80 will move from the position aligned with hole 94 to the one aligned with hole 93.

As an alternative to exerting a pull force on rope 23, it is possible to not activate the hoist that exerts tension on rope 23 and exert a longitudinal movement on carriage 90 through the means for driving the carriage along mast 5, e.g. through hoist 13 or the pull-down cylinder or other equivalent means fixed to carriage 90 to exert forces on the carriage in the longitudinal direction of mast 5 and to exert pull and/or push forces on rotary 80, as previously described.

Once the holes comprised in carriage 90 and rotary 80 have been aligned, it is possible to insert pin 22 into hole 93.

In this case as well, it is possible to insert locator elements and any other variants already illustrated, e.g. pushing carriage 90 or dropping it by activating the means for driving carriage 90 itself and leaving the hoist to which rope 23 is connected in a fixed position.

Figure 8:
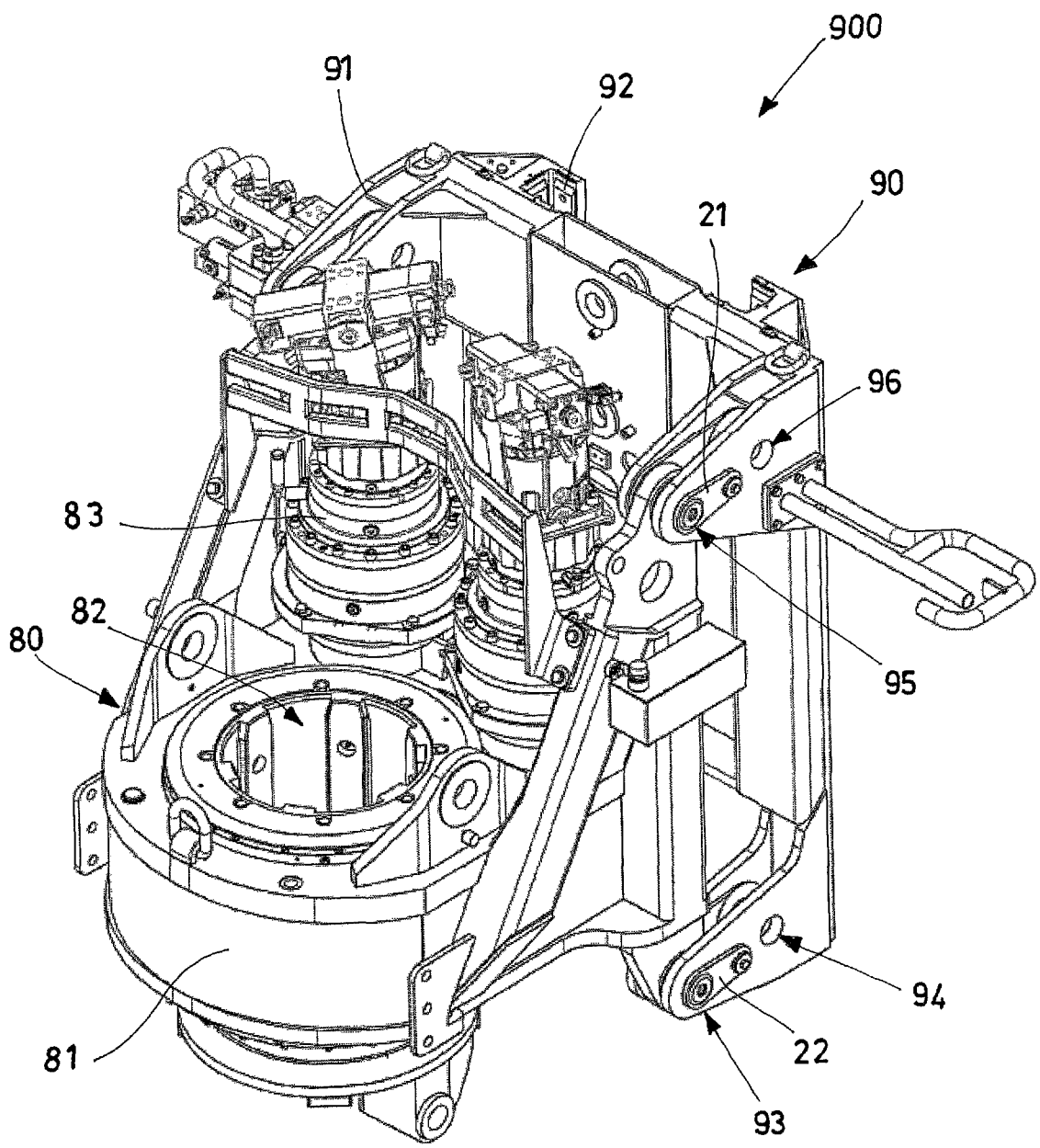
FIG. 8 shows a detailed perspective view of a first embodiment of the drive assembly of an assembly according to the present invention as shown in FIG. 5, in a second operating configuration, or extended configuration.

FIG. 8 shows a perspective view of drive assembly 900 in a second operating configuration, or extended operating configuration, wherein there is an extended working centreto-centre distance "i2". In this operating configuration of drive assembly 900, pins 21 and 22 are respectively fixed into holes 95 and 93, spaced apart along the axis perpendicular to the axis of mast 5 by a quantity "d" from the previous ones, so as to increase the excavation centre-to-centre distance to the value i2=i1+d.

After working centre-to-centre distance "i" has been extended, drilling machine 100, comprising an assembly according to the present invention, will be able to work with tools having a much bigger diameter "Ø", e.g. diameters increased by a value equal to twice the value of "d" compared to the diameters that can be used in the operating configuration with a retracted working centre-to-centre distance "i1".

The embodiment described herein allows switching from the first configuration to the second configuration of drive assembly 900, and vice versa, and the mutual movement of carriage 90 and rotary 80 occurs by means of at least two tilting movements.

As an alternative, it is possible to implement a drive assembly 900 wherein the mutual movement of carriage 90 and rotary 80 occurs by means of at least one linear movement, and wherein, while switching between the different operating configurations of drive assembly 900, said carriage 90 and rotary 80 are constrained by at least one slider-type constraint, preferably prismatic in shape.

In a second embodiment of the assembly according to the present invention, as previously specified, said drive assembly 110 comprises a second support structure, which is a central frame 112 comprises in a rod-guide 110, to which drill rod or kelly 10 can be connected.

In general, rod-guide 11 may be present on an excavating machine 100, in which case it must also be able to change working centre-to-centre distance "i".

In the second embodiment of drive assembly 110, it comprises a first structure or carriage provided as a first frame 111 slideably connected to guiding mast 5 through guiding or backing members comprised in said first frame 11. Such guide members are, for example, sliders 116. Said first frame 111 has a series of holes that are used for positioning central frame 112, which constitutes the second support structure of drive assembly 110. To such central frame 112 drill rod or kelly 10 is connected through flange 117, e.g. through the interposition of a centre plate in order to allow rod or kelly 10 to turn when rod guide 110 is not rotating.

Figure 9:
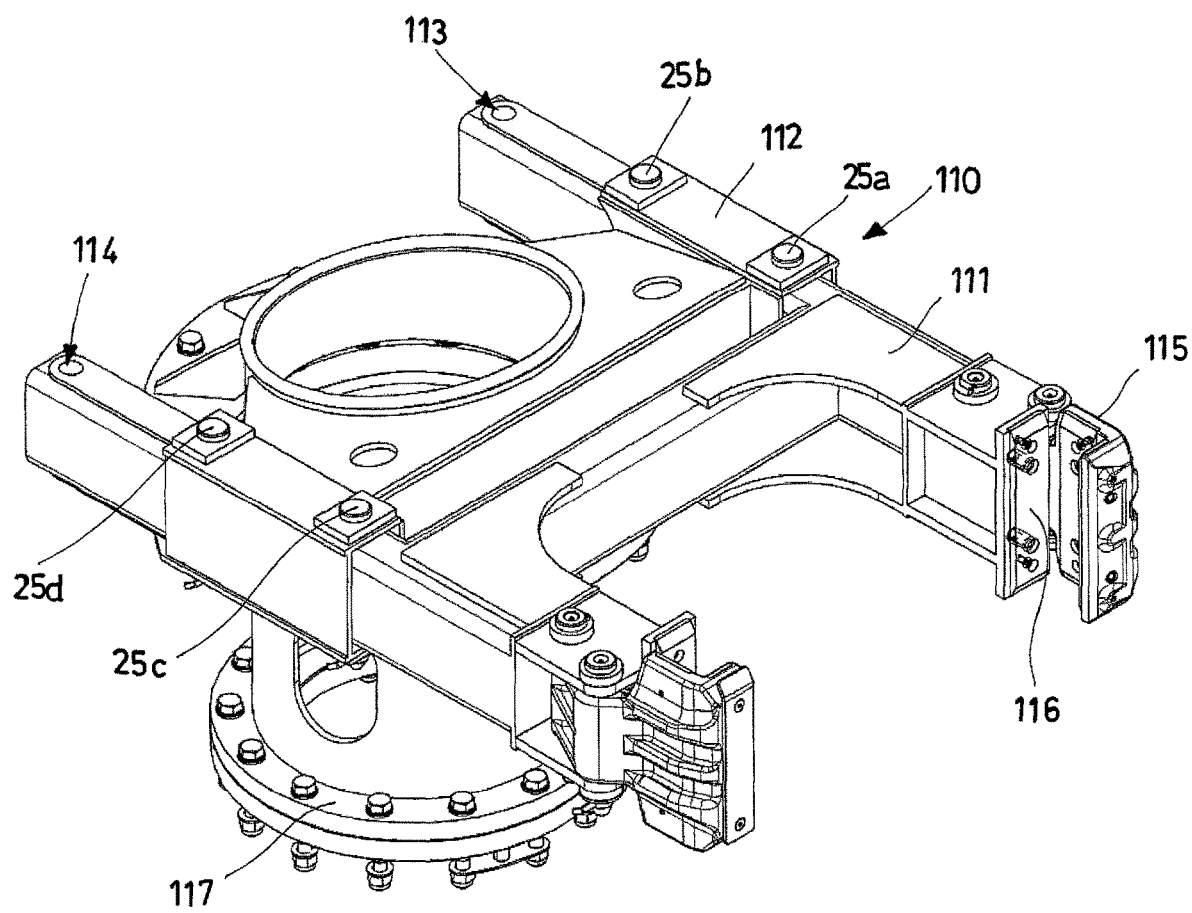
FIG. 9 shows a detailed perspective view of a second embodiment of the drive assembly of an assembly according to the present invention, in a first operating configuration, or retracted configuration.
Figure 10:
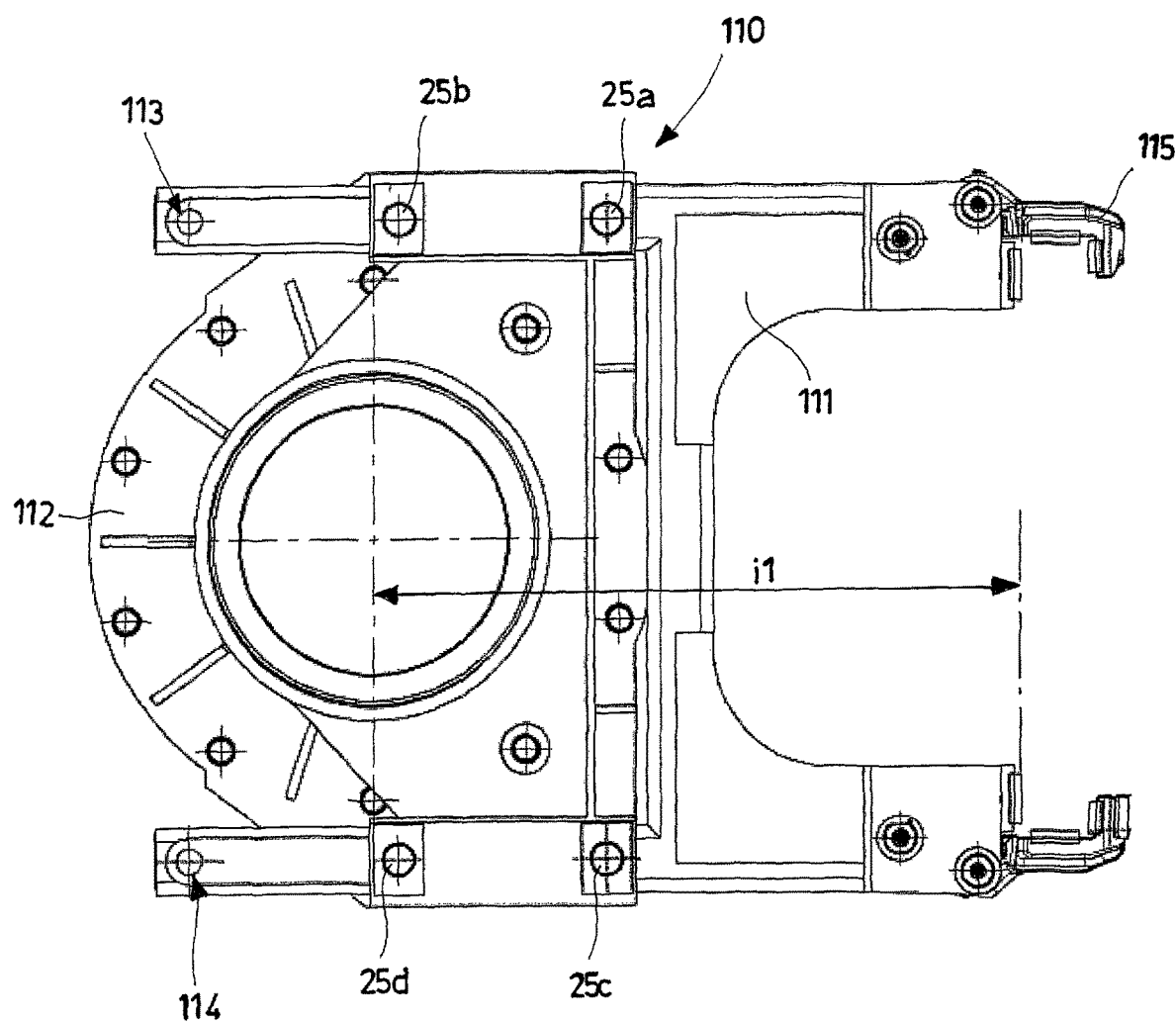
FIG. 10 shows a plan view of the drive assembly of FIG. 9, in the first operating configuration, or retracted configuration.
Figure 11:
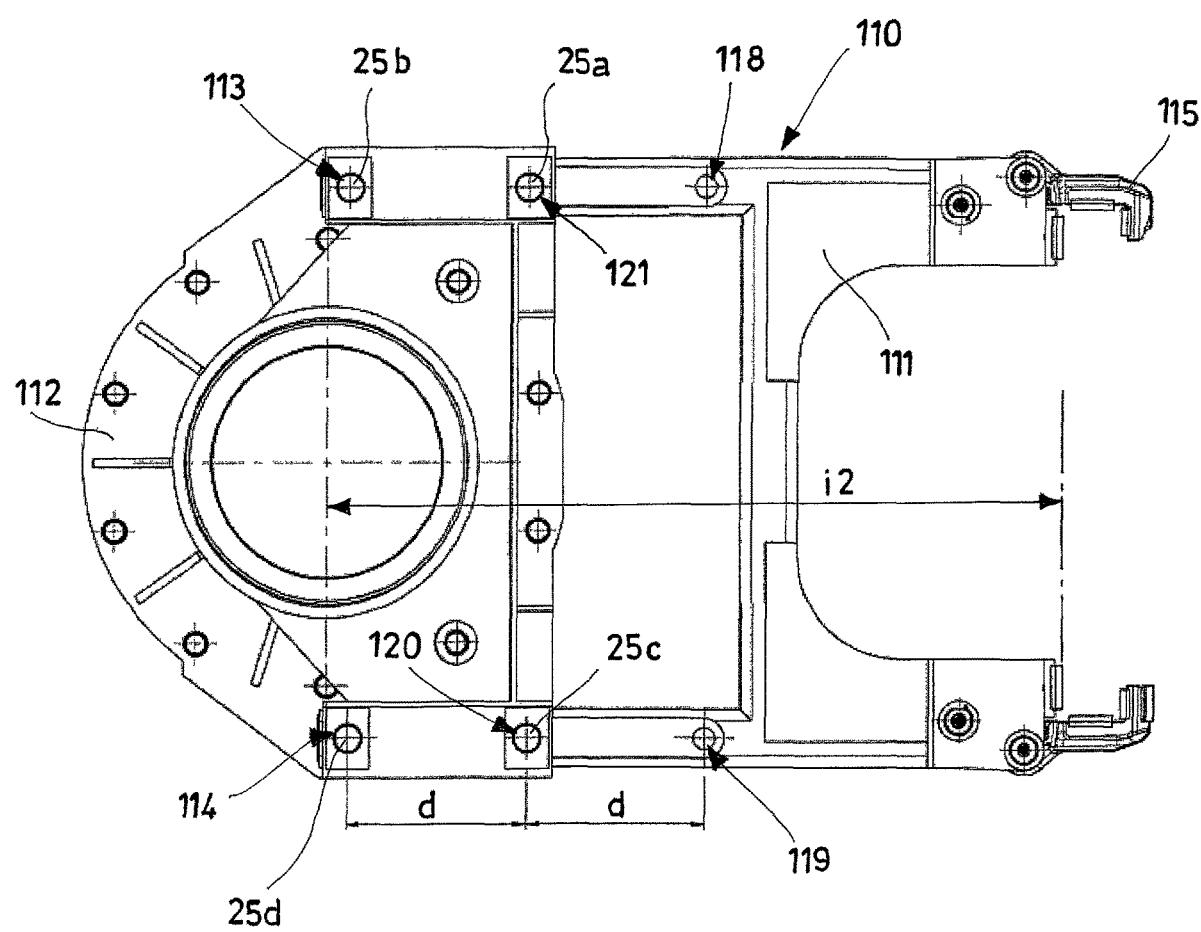
FIG. 11 shows a plan view of the second embodiment of the drive assembly, in a second operating configuration, or extended configuration.

Advantageously, sliders 116 are mounted on a hinged structure 115 that can be opened by rotation, thus allowing full access for maintenance and replacement of the sliders, e.g. three on each side, i.e. left and right, of the guide, as shown by way of example in FIGS. 9, 10, 11.

Alternatively, the guide members may consist of bronze or plastic sliders to reduce the coefficient of friction, or may be provided as rolling bearings.

In the illustrated embodiment, the first frame 111 is connected to central frame 112 by means of four pins 25a, 25b, 25c, 25d. Alternative embodiments may comprise a different number of pins, e.g. three or two or more than four.

In the illustrated embodiment, the first pair of pins 25a and 25b is aligned with at least one other hole 113 on the first frame 111. The same applies to pins 25c, 25d and hole 114.

In the case illustrated in FIGS. 9, 10, 11, central body 112 represents the female part of a slider-type constraint, e.g. prismatic in shape. Therefore, the first frame 111 represents the male part of the mechanical constraint, but the constraint parts may also be reversed, and additional holes 113, 114 may be located on central frame 112.

In an alternative embodiment, while switching from the first configuration to the second configuration of drive assembly 110, and vice versa, the mutual movement of the first frame 111 and central body 112 occurs by means of at least two rotary or tilting movements, e.g. in a way similar to the one previously described with regard to the movements of carriage 90 and rotary 80.

FIG. 10 shows rod guide assembly 10 installed in a first operating configuration, or retracted configuration, with a retracted excavation centre-to-centre distance "i1".

In the exemplary, but non-limiting, embodiment of FIG. 10 there are four pins, wherein pins 25a, 25b, 25c, 25d advantageously have the same diameter and the same length. This embodiment allows said pins to be interchanged. Preferably, at least pins 25a and 25b have the same diameter, and the same applies to pins 25c and 25d.

The exemplary, but non-limiting, embodiment of FIG. 11 shows drive assembly or rod guide 110 in a second operating configuration, or extended configuration, with an extended excavation centre-to-centre distance "i2".

One possible method for changing an excavation centre-to-centre distance "i" of an excavating machine 100 according to the present invention, wherein the drive assembly is a rod-guide 110, comprises the following steps:
 removing at least two pin-type fixing means that constrain a first structure or carriage (90, 111) and said second support structure (80, 112) of a drive assembly (110, 900);
 mutually moving said first structure or carriage (90, 111) and said second support structure (80, 112) by means of a linear movement, so as to switch from a first configuration to a second configuration, controlling the movement by means of at least one actuator (23, 13);
 constraining again said first structure or carriage (90, 111) and said second support structure (80, 112) by means of said at least two pin-type fixing means.

Describing the construction of one possible embodiment more in detail, the mutual movement of frames (111, 112) can occur after the removal of the fixing pins, i.e. pins 25a, 25b, 25c, 25d. In the illustrated embodiment, the switching between the different operating configurations is effected by causing the first frame 111 and second central frame 112 to slide relative to each other.

During the relative sliding occurring between the frames of rod-guide 110, a prismatic mechanical constraint is in effect, as can be clearly understood from the drawings.

By moving the two frames (111, 112) away from each other, it is possible, after aligning holes 113 and 114 of both frames (111, 112), to insert pins 25b and 25d. Pins 25a and 25c that were fixed into holes 118 and 119 can be used for fixing frames (111, 112) to each other in the middle holes previously occupied by pins 25b and 25d, as shown by way of example in FIG. 10.

In the present embodiment, the three holes per side of rod-guide 110 are distant from each other by the same quantity "d". The extension sliding action results in a desired increase of the excavation centre-to-centre distance "i", which becomes i2=i1+d.

In an equivalent solution there may be just four holes, two on each side of rod-guide 110, e.g. holes 113, 121 and holes 114, 120, spaced apart by a quantity "d". As an alternative, it is possible to generate intermediate configurations between the first operating configuration and the second operating configuration of rod-guide 110, wherein multiple fixing holes may be provided to move the two frames (111, 112) relative to each other by desired quantity "d".

The pins may be either fully removable or integral with either frame, advantageously with the female one, in this case central frame 112.

When integral with a frame, they can be raised in a position that allows clearing the holes of the other frame, thus longitudinally disengaging the two frames from each other, so that relative movement can be effected, in particular by sliding them relative to each other. When the new position is reached, the pins can be lowered again and inserted into the holes of the other frame. In one possible embodiment, rod guide 110 implements snap-action pins.

In general, if the pins are equal, at least in pairs, it is possible to use the pins of each pair without distinction in order to fasten the two frames (111, 112).

Figure 12:
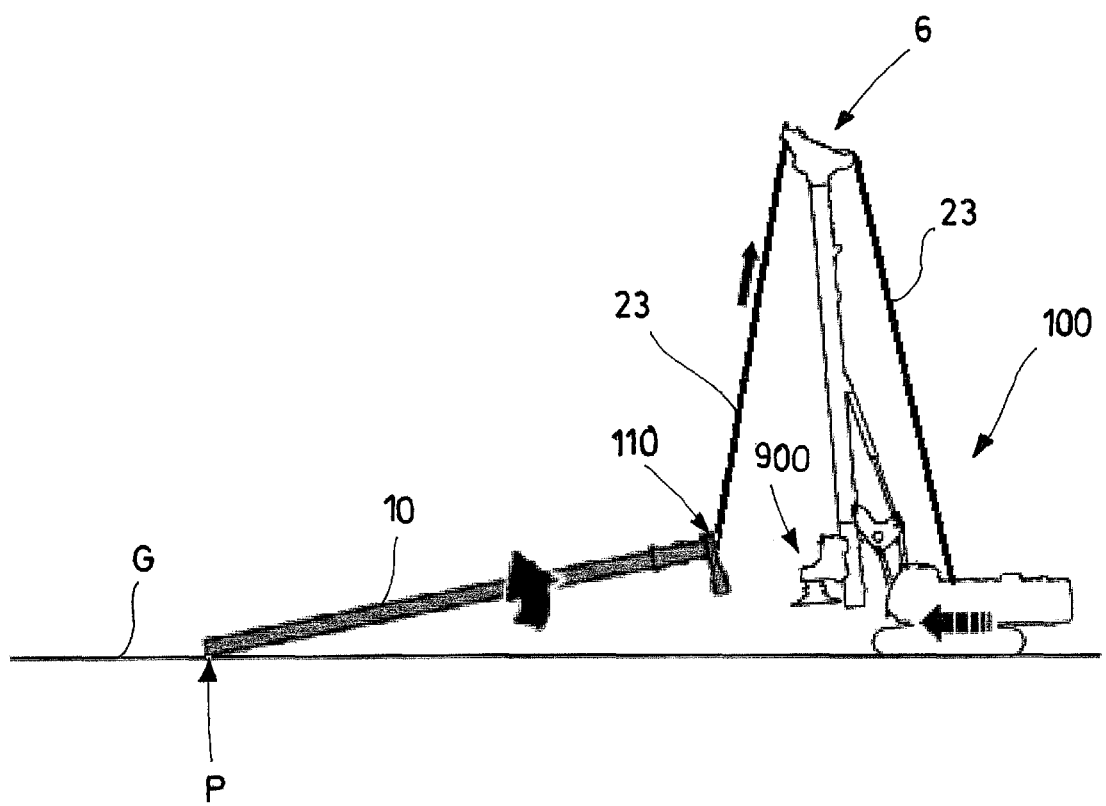
FIG. 12 shows a side view of the excavating or drilling machine during the phase of driving excavating equipment, wherein the second embodiment of the drive assembly according to the present invention allows switching the drive assembly between the different operating configurations, according to one possible exemplary, but non-limiting, embodiment.

FIG. 12 shows the second embodiment of the assembly for driving excavation or drilling equipment (10, 12) according to the present invention.

This embodiment is exemplary only and non-limiting, but represents an advantageous approach for reducing the downtime necessary for changing working centre-to-centre distance "i".

During the manoeuvres for dismounting drill rod or kelly 10, necessary for disengaging rotary 80, e.g. for ensuring that excavation centre-to-centre distance "i" can be changed as previously described and illustrated, it is possible to exploit the hoist normally used for raising rod or kelly 10 in order to adjust working centre-to-centre distance "i" on rod-guide 110.

Drill rod or kelly 10 is placed in a configuration lowered to ground "G", wherein its bottom end lies on the ground, e.g. at point "P", and the other end is connected to rope 23 of one of the hoists available for this raising operation. Advantageously, it is possible to use rope 23a of the main hoist, because the latter is installed in alignment with the axis of rotation of excavating tool 12. Said rope 23 is connected, in particular, to the top end of drill rod 10, e.g. of the innermost element of a telescopic kelly, preferably through the interposition of a swivelling joint.

When rope 23 is slackened, the drill rod or kelly 10 will tend to go down under its own weight, turning about point "P".

Preferably, when a height reachable from the ground is arrived at, pins 24a, 24b, 24c, 24d are removed in order to disengage the two frames (111, 112) of rod-guide 110 from each other.

In particular, this disengagement can occur when also the bottom end of rod guide 110, in particular the first frame 111, lies on ground "G" or against a backing element placed on the ground.

Assuming to start from the first operating configuration, or retracted configuration, with an excavation centre-to-centre distance "i1", by raising drill rod or kelly 10 it is possible to cause the first frame 111 and central frame 112 to slide relative to each other under their own weight, until the second operating configuration, or extended configuration, is reached. Once this latter operating configuration has been reached, it is possible to insert the pins into the holes corresponding to the new position that provides extended excavation centre-to-centre distance "i2".

Vice versa, in order to reduce the excavation centre-to-centre distance, e.g. in order to switch from the second operating configuration to the first operating configuration of rod guide 110, after having laid drill rod or kelly 10 on the ground at point "P", and having also laid on the ground rod guide 110 at the opposite end, the pins can be disengaged and rope 23 can be released, e.g. by unwinding the hoist, preferably the main hoist, in order to cause the first frame and the central frame of the rod-guide to slide relative to each other. Said main hoist, as previously specified, may be located either on rotating tower 1 or on mast 5. By releasing the rope, it is possible to re-close the two frames (111, 112) of rod-guide 110 until the retracted operating configuration is reached, in which the fixing pins will be inserted again into the respective holes.

In order to facilitate the steps of switching between the different operating configurations, it is possible to employ mechanical locators, as described with reference to the preceding embodiment of the assembly. Said mechanical locators may be adjustable, if necessary, e.g. via a screw mechanism, and are preferably removable. Such an embodiment allows sliding the two frames (111, 112) relative to each other by a desired or required quantity, e.g. a quantity "d". In this case as well, the pins may advantageously have a tapered point to facilitate the assembling.

The devices described so far in the different embodiments of the machine, system, assembly and drive assembly have removable pin-type fixing systems that are moved, removed, even only partially, and reversed manually.

FIG. 14 shows a variant wherein the pin is motorized and controlled automatically, e.g. remotely.

Pin 204 may be any one of those previously described, i.e. any one of pins 21, 22, 25a, 25b, 25c, 25d, 28. The motorized pin can be implemented for all of the above-described pins.

For illustrative purposes, in order to allow understanding the characteristics of the pin, frame 205 that in this case is shown as having a double bracket, i.e. a female bracket, may be a structure of drive assembly (110, 900), e.g. the first structure or carriage (90, 111). The second frame, not shown in the drawing, is inserted between the two walls 205a and 205b of frame 205. The second frame may be the other structure of drive assembly (110, 900), e.g. the second support structure (80, 112). The second frame, not shown, is secured by pin 204, which is inserted into its hole and, after running past the second frame, is centred and inserted into hole 206 on part 205b of the first frame 205, thus constraining the two frames together.

Pin 204 comprises an actuator that allows the pin to make an axial movement. Said actuator can receive a drive signal preferably sent, e.g. remotely, from the cabin of rotating tower 1, or from a remote control, whether an electric or wireless one. In a preferential embodiment, the actuator is a linear actuator 201, e.g. a hydraulic cylinder. In a second variant, said linear actuator 201 may be powered by equivalent and alternative types of energy, such as, for example: electric, pneumatic, magnetic. Linear actuator 201 is removably fixed to spacer 202 through a fitting 203, preferably by means of screws, to allow dismounting pin 204 from the seat.

The pin is driven by actuator 201, which moves it axially from an extended or engaged configuration to a retracted or disengaged configuration. In the extended configuration, as shown in FIG. 14, the head of the pin engages into hole 206 on wall 205b, opposite to wall 205a whereon spacer 202 is integrally or removably fixed. In the retracted or disengaged configuration, the pin moves back into spacer 202, which acts as a protector. In one embodiment, in the retracted or disengaged configuration pin 204 remains engaged in hole 208 of the first wall 205a, so as to fully clear the hole of the second frame and allow the latter to move relative to frame 205. Pin 204 has a tapered head portion to facilitate the insertion and centring of the holes through which it must run.

A position sensing device 207, e.g. a limit switch, may detect the inserted position of the pin and send a signal to the control unit of the machine, indicating that the pin has been inserted.

The drawing shows a female frame 205, but it is clear that the frame may have just one wall and connect to the second frame, which also has just one wall. In such a case, the actuation system may be mounted on either wall without distinction, on the side opposite to that where the same walls of the frame are coupled together.

It is apparent that in the drive systems or drive assemblies described above, from FIG. 3 to FIG. 13, each pair of frames unconstrained or constrained by means of pins may comprise a motorized pin, e.g. as previously described and illustrated in FIG. 14.

Preferably, actuator 201 is positioned outside the structure of the drive assembly, e.g. outside the first structure or carriage, so as to avoid taking up space internally.

With reference to the embodiment of drive assembly 900 having a carriage 90 and a rotary 80, wherein the relative movements of the parts are rotary movements, it is preferable that one actuator be associated with the pin in each hole. With reference to the illustrated embodiment, four actuators and four pins will be required on the left-hand side and as many actuators and pins will be required on the opposite, right-hand side of drive assembly 900.

With reference to the embodiment of drive assembly 110 illustrated in FIG. 10, the actuator may be fixed to central frame 112 at pins 25a, 25b, 25c, 25d. When only two pins are used, only two actuators will be necessary, which may work either synchronously or autonomously and independently.

The advantages of the assembly for driving parts according to the present invention are apparent in light of the above description and the annexed drawings.

More in detail, the following can be inferred:
- the connections between the structures of the drive assembly are rigid ones, e.g. using pins, with no adjustment linkages that would introduce play in the couplings and promote the arising of vibrations in operating conditions, resulting in excavation inaccuracy;
- no dedicated actuators are necessary for moving the parts or structures of the drive assembly in order to switch between the different operating configurations, because an actuator already present on the machine is used which is configured for carrying out additional operative functions for driving parts of an excavating or drilling machine 100 or of the drilling equipment, e.g. one of the hoists not used in the steps of changing the excavation centre-to-centre distance, resulting in considerable savings in economical and practical terms;
- it is not necessary to install complex and heavy driving devices in areas on the excavation face, which cause great instability of the machine;
- the switching from one operating configuration to the other is carried out in a short time, e.g. a few minutes, resulting in a considerable advantage in terms of time and productivity, thus considerably reducing the machine downtimes;
- it is not necessary to install any heavy and expensive spacers or third elements that require the complete disassembling of the parts to be spaced apart, resulting in wasted time;
- it is not necessary to use any external handling systems, e.g. cranes, to support the parts during the movements;
- it is not necessary to disconnect the ropes or the hydraulic (or electric) power supplies in order to dismount motorized parts, such as the rotary, thus reducing the transformation times and preserving the environment against contamination from hydraulic fluids;
- the system as claimed in FIG. 3 allows switching, through a few simple movements, from a retracted configuration to an extended configuration by means of plain rotations that are safe, simple and easily controllable, while also being automatable;
- the ease of switching from a retracted configuration to an extended configuration allows the machine to be quickly set up for switching from reduced-diameter tools to increased-diameter tool, so that the same machine can be configured for two different technologies, or anyway for an extended range of use;
- it is not necessary to fully replace parts of the machine, such as carriages or a rod-guide with a short centre-to-centre distance, with other parts suitable for working with an extended centre-to-centre distance, thus reducing the costs and being able to work continuously with the same parts, by simply changing the conformation of the drive assembly via a relative movement of the parts thereof;
- the possibility of automating the system and controlling it remotely allows, in countries where it is not advisable to work at height for safety reasons, changing the excavation geometry without requiring the personnel to intervene directly, leading to improved safety.

The following will describe a sequence of steps for changing the excavation centre-to-centre distance "i" of an excavating or drilling machine 100. This sequence of steps is merely exemplary and non-limiting, and explicitly refers to the specific embodiments illustrated in the drawings.

Preferably, drilling machine 100 is configured in a vertical position, as shown by way of example in FIG. 1, and is set up with the following devices: rotary 80, carriage 90, head 60, rod-guide 110, if present, with a telescopic drill rod or kelly 10, installed at retracted excavation centre-to-centre distance "i1".

In order to switch from the first operating configuration at working centre-to-centre distance "i1" to the second operating configuration at working centre-to-centre distance "i2", the following procedure is carried out:

step 1: dismounting drill rod or kelly 10 by extracting it from mast 5 in accordance with the normal procedures, raising the drill rod past rotary 80, while rotary 80 is positioned at the bottom part or base of mast 5. Drill rod 10 is lowered to the ground until its bottom end, opposite to the point where rope 23a is hooked, touches ground "G" at point "P";

step 1a: if rod-guide 110 is present, it is possible to remove drill rod or kelly 10 from the mast only after having disengaged rod-guide 110 from the guides of mast 5, e.g. by raising rod or kelly 10, using the main hoist, by means of rope 23a up to the point on mast 5 where the guides have recesses that allow rod-guide 110 to be disengaged from the guides of mast 5;

step 1b: as an alternative to step 1a, opening guides 115, turning them about the hinge and disengaging them from the guides on mast 5; rod-guide 110 is located near the top of mast 5, whereas rotary 80 is in proximity to the base of mast 5, so that also the longest rods or kellies 10 can come out of rotary 80 from above the same rotary 80;

step 2: with rotary 80 still positioned near the base of mast 5, preferably in a position that can be reached from the ground, connecting rope 23 of one of the available hoists to rotary 80. For example, the available hoist may be the service hoist, because the main hoist may still be connected to rod or kelly 10. The rope of the hoist is fastened to rotary 80 at any hooking point, preferably at hook 86. It is then possible to remove a first constraint, e.g. pin 21 on the left-hand side and pin 21 on the right-hand side, getting ready for the rotation of rotary 80 relative to carriage 90 about the axis passing through hole 94 in which pin 22 is inserted;

step 3a: while modulating the pull force of the hoist, a suitable tension is exerted on rope 23 which allows releasing the rotary and causing it to rotate under its own weight, until the hole on the frame of rotary 80 becomes coaxial to the one 95 of the carriage, into which pin 22 is then inserted on both the left-hand and right-hand sides, thus taking an intermediate configuration;

step 3b: as an alternative to the preceding step, pull modulation is effected by acting upon the pull/push system connected to carriage 90 while rotary 80 is being held by rope 23 only, which is not actuated during this step; by raising carriage 90, i.e. sliding it towards the top of the mast, rotary 80 is made to rotate until the upper hole of its frame 81 reaches hole 95; when such holes are coaxial, pin 21 is fixed into left-hand hole 95, and the same is done on the right-hand side;

step 4: lower pin 22 is extracted from hole 94, thus allowing rotation about the axis of hole 95, on both the left-hand side and the right-hand side;

step 5a: while modulating the pull force of the hoist, a suitable tension is exerted on rope 23 which allows pulling the rotary and causing it to rotate, driven by the hoist, which overcomes the weight of rotary 80, until the hole on the frame of rotary 80 becomes coaxial to the one 93 of carriage 90, into which pin 22 is then inserted on both the left-hand and right-hand sides;

step 5b: as an alternative to the preceding step, pull modulation is effected by acting upon the pull/push system connected to carriage 90 while rotary 80 is being held by rope 23 only; by lowering carriage 90, i.e. sliding it towards the base of the mast, rotary 80 is made to rotate until the lower hole of its frame reaches hole 93; when such holes are coaxial, pin 22 is fixed into left-hand hole 93, and the same is done on the right-hand side. At the end of this step, drive assembly 900 will be already in the second operating configuration, since it can already operate at working centre-to-centre distance "i1";

step 6: at the end of step 5, or after step 1 when rod-guide 110 is present, with the bottom end of rod or kelly 10 resting on the ground at point "P", the descent of rope 23a is modulated by releasing the main hoist, until rod-guide 110 lies on the ground or against a backing element; pins (25a, 25b, 25c, 25d) that secure the two frames 111 and 112 are removed and, while raising rod or kelly 10 by pulling rope 23a, central frame 112 is raised relative to the first frame 111, which stays low under its own weight; when the new operating configuration, or extended configuration, is reached, the pins are fixed into the new holes 113; 114 and into the previous holes 121 and 120;

step 7: rod or kelly is disconnected from the main hoist, e.g. by disconnecting rope 23a, preferably from the internal element of the telescopic rod:

step 8a: mast 5 is lowered into the transport condition in order to adapt head 60 to the new excavation centre-to-centre distance "i2", and then mast 5 is brought back into the vertical configuration;

step 8b, to be carried out as an alternative to step 8a: the work on head 60 is carried out at height, and changes are made thereto in order to obtain the new excavation centre-to-centre distance "i2";

step 9: drill rod or kelly 10 is installed after connecting rope 23a of the main hoist to rod 10, in particular to the innermost element of the rod, proceeding in reverse order to the order laid down in steps 1, 1a or 1b.

In the light of the present sequence of steps, as well as of the previous description and the annexed drawings, a person skilled in the art will be able to determine a sequence of steps necessary for switching from the second operating configuration with an extended centre-to-centre distance "i2" to the first operating configuration with a centre-to-centre distance "i1".

Drilling machine 100 is generally equipped with at least one control unit, through which information is gathered from the sensors installed on the machine in order to detect positions, speeds, pressures and any other parameters useful for the execution of the excavation work, whether during the drilling operations or during the handling and translation operations. The control unit processes the information and outputs data, and also sends alarms for the operator on control panels, e.g. in the cabin or on a remote console, and, if necessary, directly controls the actuators and motors in order to set the machine into a safe condition.

Likewise, such functionality can also be applied to the assembly and the system for changing the centre-to-centre distance, as well as to the method for changing the centre-to-centre distance, as described above.

In particular, with reference to FIG. 3, the minimum level of control that can be provided concerns the mutual movement of the first structure or carriage (90, 111) and the second support structure (80, 112), e.g. the relative movement between rotary 80 and carriage 90, e.g. for the purpose of carrying out the two rotations necessary for switching from hole 96 to hole 95, and/or from hole 94 to hole 93, and vice versa. Since the arc of rotation is known, and so are distances "d", also the angle of rotation is known. In one possible embodiment, for example, the rotation corresponds to an angle of 11° for both the upper holes and the lower holes.

In order to determine the angle of rotation between rotary 80 and carriage 90, the control unit can, e.g. by means of an inclinometer integral with the frame of rotary 80, determine the differential inclination relative to carriage 90. The control unit can also determine an actual value between the two structures, in that carriage 90 is aligned with mast 5, which already has an inclinometer necessary for ensuring the verticality of mast 5 and hence of the excavating tools. The differential angle between the two readings of the two inclinometers will determine the actual rotation between parts (80, 90), which will have to be equal to the angle of rotation, i.e. for example, 11°.

Since it is possible to determine the actual angle of rotation, the control unit can send a signal for the operator for stopping the movement in the positions that allow the insertion of the pins, or, in a more automated version, it may issue closing commands towards automatic latches or actuators 201. In this case, no manual intervention will be required.

As an alternative, in the case wherein the mutual movement of the parts is achieved by operating one of the actuators already present in the excavating machine, e.g. the hoists, and in particular the main hoist or the service hoist, it is possible to determine the relative movement, for example, by means of a depth meter measuring the extent of unwinding of the rope. Encoder-based systems are known which measure depth starting from the number of revolutions, e.g. of the motor or the reducer or the drum of the hoist, or magnetic sensors measuring, for example, the revolutions of the drum in order to determine the extent of unwinding of the rope, or devices directly measuring the moving end, e.g. rope-based, optical or laser devices.

Depending on the point where the rope is attached to drive assembly 900, and depending on the known geometry of rotary 80 and carriage 90, through the control unit it is possible to determine the rotation required for switching between the two holes by sliding rope 23 in length. The control unit may possibly display the reading on a control display and/or activate alarm signals and/or activate the direct control over actuators 201 in order to fix the pins into the new positions when the rotation is complete.

In a similar manner, the control unit can control the relative movements of carriage 90 and rotary 80 when the carriage is driven by means of pull-down hoist 13 or the pull-down cylinder. If the actuator of the assembly according to the present invention is pull-down hoist 13, and knowing the position of rotary 80 along mast 5, it is possible to determine the incremental value of the movement, which depends on the same variables previously indicated for the preceding embodiment, wherein a hoist moved rope 23. Also in this latter embodiment, the movement may be effected under control of the control unit, with the resulting actions as already described.

Wholly similar concepts still apply when using, instead of a hoist, the linear actuator adapted for driving carriage 90, controlling it by means of the control unit.

Sensors may be electronically connected to said control unit, e.g. proximity or position sensors, which may use different technology, e.g. electronic, magnetic or lever-type sensors, in order to sense the positions, e.g. the end-of-travel positions between the start point and the end point, e.g. between holes 95 and 96. Once they have been properly adjusted, it is possible to know the exact position of rotary 80 when it is in either position. These signals are collected by the control unit in order to send signals and/or actuation commands as previously described.

A sensor, e.g. a limit switch 207 like the one shown by way of example in FIG. 14, may be installed to determine if the pin has been fully inserted, as a confirmation of the locking of the two parts, with the option of issuing an enable signal or unlocking an operating condition that was previously locked or forbidden.

The assembly, system, machine and method described so far, as well as all the various optional embodiments described and illustrated herein, may be subject to variations, additions and modifications that, in the light of the present description and of the annexed drawings, can be easily inferred by a person skilled in the art without however departing from the protection scope of the appended claims.

By way of example, as shown in FIGS. 3 to 8, the whole drive system has been described herein with reference to the sequence for switching from a retracted first excavation centre-to-centre distance "i1" to an extended second excavation centre-to-centre distance "i2", in particular by rotating first the upper holes from 96 to 95 and then the lower ones from 94 to 93, so that, as a consequence, the upper holes lie on an arc of circumference having as a centre the hole in which, at excavation centre-to-centre distance "i1", pin 22 is inserted at the bottom, i.e. the hole that is closer to guide members 92 of carriage 90, specifically hole 94; while the other two lower holes 94 and 93 have as a centre upper hole 95, which is farther from guide members 92 of the same carriage 90.

It is obvious that it is possible to rotate drive assembly 900 while leaving pin 21 inserted in hole 96. In this case, lower holes 93 and 94 will be positioned on a circumference having as a centre hole 96 in which pin 21 is fixed. Subsequently, holes 95 and 96 will be arranged on a circumference that will have as a centre hole 93 in which pin 22 is fixed in the intermediate configuration, equivalent to the one illustrated in FIG. 6.

For the purposes of the present invention, the term pin, e.g. pins 21 and 22, refers to either a pin passing through the first structure or carriage, e.g. carriage 90, from one side to the other thereof, which uses at least one hole available on the second support structure, e.g. the frame of rotary 80, and at least one hole available on the same first structure or carriage, or, preferably, at least one hole on the second support structure and at least two holes on the first structure or carriage, or, as a further alternative, two or more holes on the first structure or carriage and two or more holes on the second support structure. In a preferable embodiment, pin 21 on the left side that secures the first structure or carriage to the second support structure is complemented with an opposite hole on the right side, coaxial to the former, which secures the first structure or carriage to the second support structure also on the opposite side. The same also applies to pin 22. In a preferred embodiment, the structures of rotary 80, and in particular of fabricated base 81, and of carriage 90, and in particular of frame 91, are symmetrical with respect to a vertical and longitudinal plane passing through the centre of rotation of quill 82 and through the centre line of motors 84, and therefore the holes shown on the left side are also present on the right side (see hole 95' symmetrical to the hole 95 in FIG. 3).

In general, in a preferred but non-limiting embodiment, each pair of holes (95-96 and 93-94) is present on the female frame, whereas the male frame may have only one hole for fixing it to the holes of one pair. In the more specific case of drive assembly 900, if rotary 80 has a female frame and carriage 90 has a male frame 91, opposite to the configuration shown in the drawings, the pairs of holes allowing the movement as previously described will be integral with rotary 80, not with carriage 90.

In general, in the case wherein both structures of a drive assembly have either male or female connection frames, at least one of the two frames will have at least one pair of holes with axes spaced apart by distance d, and these may be located, without distinction, on either one of the two frames of the two structures.

If a third excavation centre-to-centre distance "i3", different from the previously described excavation centre-to-centre distances "i1" and i2", were to be generated, for example equal to i1+"d'", where "d'" is different from and preferably greater than "d", it will suffice to add at least one additional upper hole 95" and at least one additional lower hole 93" respectively at the same distance "d'" from holes 95 and 93 or holes 94 and 96; together with the adjacent ones, the new holes will constitute another pair of upper and lower holes, and therefore may have the following characteristics:

the upper pair of holes lie on an arc passing through the centre of hole 93 in which pin 22 is inserted to impart the rotation from 95 to 95"; therefore, the lower pair of holes 93 and 93" lies on a circumference the centre of which is in line with hole 95" in which pin 21 is inserted for the last rotation that brings the rotary to excavation centre-to-centre distance "i3";

or, vice versa, the lower pair of holes lie on a circumference having as a centre hole 95 in which pin 21 is inserted and around which rotation occurs to switch from 93 to 93"; therefore, upper holes 95 and 95" lie on a circumference having as a centre the axis of hole 93";

or hole 95" may be located on the circumference passing through 96 and having as a centre the centre of hole 94—in this case a change will occur directly from the first excavation centre-to-centre distance "i1" to the third excavation centre-to-centre distance "i3" without passing by the second excavation centre-to-centre distance "i2" as in the previously described cases—and therefore holes 93" and 94 lie on the circumference having as a centre hole 95";

or hole 93" lies on the circumference passing through 94 and having as a centre the axis of hole 96, and holes 96 and 95" lie on a circumference having as a centre the axis of hole 93".

The invention claimed is:

1. An assembly for driving excavating or drilling equipment for an excavating or drilling machine; the excavating or drilling machine comprising:
    a rotating tower comprising: a base frame connected to an undercarriage;
    a mast, the upper end of which comprises a head for supporting pulleys for the sliding of ropes, said ropes being operably connected to an actuator in the excavating or drilling machine;
said assembly comprising:
    a drive assembly adapted to slide along said mast of said excavating or drilling machine, for driving at least a part of the excavating or drilling equipment,
said drive assembly comprising:
    a first structure or carriage comprising guide members adapted to allow the first structure or carriage to slide along said mast;
    a second support structure adapted for at least supporting the excavating or drilling equipment;
    removable pin-type elements adapted to be inserted into holes made in said first structure and said second structure;
    said first structure or carriage and said second support structure being movable relative to each other between a first configuration and a second configuration;
    said actuator being adapted for at least controlling relative movement of said first structure or carriage with respect to said second support structure;
    wherein switching between the first configuration and the second configuration changes a distance between said second support structure and said mast along an axis perpendicular to a longitudinal axis of said mast;
    said removable pin-type elements being adapted to rigidly and directly constrain said first structure or carriage and said second support structure in said first configuration or second configuration;
    while switching between the first configuration and second configuration, said first structure or carriage and said second support structure are always directly constrained to each other through at least one mechanical constraint;
    said actuator, in addition to controlling at least the relative movement of said first structure or carriage with respect to said second support structure, is configured for carrying out further operative functions for driving parts of said excavating or drilling machine.

2. The assembly according to claim 1, wherein for switching from the first configuration to the second configuration, the relative movement between said first structure and said second structure is effected by means of at least one rotary movement.

3. The assembly according to claim 2, wherein the rotary movements are at least two;
    while switching between the first configuration and the second configuration, said first structure or carriage and said second support structure are constrained via the pin-type elements which form hinge constraints, wherein a first rotary movement occurs with respect to a first hinge constraint and a second rotary movement occurs with respect to a second hinge constraint.

4. Assembly The assembly according to claim 3, wherein said first structure or carriage or said second structure comprises at least two pairs of holes;
    a first pair of holes lies on a first circumference, and a second pair of holes lies on a second circumference;
    a center of said first circumference being one of the holes of said second pair, and a center of said second circumference being one of the holes of said first pair.

5. The assembly according to claim 1, wherein, for switching between the first configuration and the second configuration, the relative movement between said first structure or carriage and said second support structure is effected by means of at least one linear movement;
    while switching between the first configuration and the second configuration, said first structure or carriage and said second structure are constrained via at least one slider-type prismatic-shaped constraint.

6. The assembly according to claim 1, wherein said second support structure is a rotary, wherein the rotary works in all of the operating configurations taken by the drive assembly in order to carry out an excavation or a drilling operation.

7. The assembly according to claim 1, wherein said first structure or carriage and said second support structure are constrained to each other by said pin-type elements; each of said pin-type elements is driven axially by a respective actuator;
    said assembly being adapted to be controlled by a control unit.

8. The assembly according to claim 1, wherein said actuator exerts a force along one direction only;
    said actuator comprises a hoist.

9. The assembly according to claim 1, wherein said actuator is fastened at one end to at least one portion of the drilling machine and is connected at the other end to at least one of: said first structure or carriage, said second support structure, or said excavating or drilling equipment.

10. A system for changing an excavation centre-to-centre distance of an excavating machine, said excavating machine comprising:
    a rotating tower comprising: a base frame connected to an undercarriage;
    a mast, an upper end of the mast comprises a head for supporting pulleys for sliding of ropes; said ropes being operably connected to an actuator in the excavating machine; and
    a rotary, to which an excavating tool is secured by a kelly;
    said system for changing the excavation centre-to-centre distance comprises:
    a drive assembly for driving excavating or drilling equipment comprising:
    a first structure, in which said kelly is housed, said first structure being slidable along said mast by a first carriage;

a second support structure, in which said kelly is housed, said second structure being slidable along said mast by a second carriage;
removable pin-type elements adapted to be inserted into holes made in said first support structure and said second support structure;
said first structure or first carriage and said second support structure being movable relative to each other between a first configuration and a second configuration;
said actuator being adapted for at least controlling relative movement of said first structure with respect to said second support structure;
wherein switching between the first configuration and the second configuration changes a distance between said second support structure and said mast along an axis perpendicular to a longitudinal axis of said mast;
said removable pin-type elements being adapted to rigidly and directly constrain said first structure or first carriage and said second support structure in said first configuration or said second configuration;
while switching between the first configuration and the second configuration, said first structure or first carriage and said second support structure are always directly constrained to each other through at least one mechanical constraint;
said actuator, in addition to controlling at least the relative movement of said first structure or first carriage with respect to said second support structure, is configured for carrying out further operative functions for driving parts of said excavating or drilling machine.

11. The system according to claim 10, wherein said head comprises a pulley drive mechanisms, which is adapted to change position of the pulleys, in accordance with movement of said drive assembly, between the first configuration and the second configuration.

12. A method for changing an excavation centre-to-centre distance of an excavating or drilling machine comprising an assembly for driving excavating or drilling equipment for the excavating or drilling machine; the excavating or drilling machine comprising:
a rotating tower comprising: a base frame connected to an undercarriage;
a mast, the upper end of which comprises ahead for supporting pulleys for the sliding of ropes, said ropes being operably connected to an actuator in the excavating or drilling machine;
said assembly comprising:
a drive assembly adapted to slide along said mast of said excavating or drilling machine, for driving at least a part of the excavating or drilling equipment,
said drive assembly comprising:
a first structure or carriage comprising guide members adapted to allow the first structure or carriage to slide along said mast;
a second support structure adapted for at least supporting the excavating or drilling equipment;
removable pin-type elements adapted to be inserted into holes made in said first structure and said second structure;
said first structure or carriage and said second support structure being movable relative to each other between a first configuration and a second configuration;
said actuator being adapted for at least controlling relative movement of said first structure or carriage with respect to said second support structure;
wherein switching between the first configuration and the second configuration changes a distance between said second support structure and said mast along an axis perpendicular to a longitudinal axis of said mast;
said removable pin-type elements being adapted to rigidly and directly constrain said first structure or carriage and said second support structure in said first configuration or said second configuration;
while switching between the first configuration and the second configuration, said first structure or carriage and said second support structure are always directly constrained to each other through at least one mechanical constraint;
said actuator, in addition to controlling at least the relative movement of said first structure or carriage with respect to said second support structure, is configured for carrying out further operative functions for driving parts of said excavating or drilling machine;
said method comprises the following steps:
removing at least two of the pin-type elements;
mutually moving said first structure or carriage and said second support structure, so as to switch from the first configuration to the second configuration, controlling movement by the actuator;
reinserting said at least two of the pin-type elements to constrain again said first structure or carriage and said second support structure.

13. The method according to claim 12, wherein the step of moving said first structure or carriage and said second support structure occurs by linear movement.

14. The method according to claim 12, said method being automated and implemented by a control unit.

15. A method for changing an excavation centre-to-centre distance of an excavating or drilling machine comprising an assembly for driving excavating or drilling equipment for the excavating or drilling machine; the excavating or drilling machine comprising:
a rotating tower comprising: a base frame connected to an undercarriage;
a mast, the upper end of which comprises a head for supporting pulleys for the sliding of ropes, said ropes being operably connected to an actuator in the excavating or drilling machine;
said assembly comprising:
a drive assembly adapted to slide along said mast of said excavating or drilling machine, for driving at least a part of the excavating or drilling equipment,
said drive assembly comprising:
a first structure or carriage comprising guide members adapted to allow the first structure or carriage to slide along said mast;
a second support structure adapted for at least supporting the excavating or drilling equipment;
said first structure or carriage and said second support structure being movable relative to each other between a first configuration and a second configuration;
the relative movement between said first structure or carriage and said second support structure is rotatory;
said first structure or carriage and said second support structure being constrained to each other in the first configuration and the second configuration by first pin-type fixing elements adapted for defining a first constraining axis, and second pin-type fixing elements adapted for defining a second constraining axis;
said actuator being adapted for at least controlling relative movement of said first structure or carriage with respect to said second support structure;
wherein switching between the first configuration and the second configuration changes a distance between said second support structure and said mast along an axis perpendicular to a longitudinal axis of said mast;

said removable pin-type elements being adapted to rigidly and directly constrain said first structure or carriage and said second support structure in said first configuration or said second configuration;

while switching between the first configuration and the second configuration, said first structure or carriage and said second support structure are always directly constrained to each other through at least one mechanical constraint;

said actuator, in addition to controlling at least the relative movement of said first structure or carriage with respect to said second support structure, is configured for carrying out further operative functions for driving parts of said excavating or drilling machine;

in order to switch from a first operating configuration to a second operating configuration, the method comprises the following steps carried out in succession:

removing the first pin-type fixing elements, thereby releasing a first constraint;

mutually moving said first structure or carriage and said second support structure, so as to switch from the first configuration to an intermediate configuration, turning about said second constraining axis and controlling the movement by the actuator;

constraining again said first structure or carriage and said second support structure by said first pin-type fixing elements;

removing said second pin-type fixing elements, thereby releasing a second constraint;

mutually moving said first structure or carriage and said second support structure, so as to switch from said intermediate configuration to said second configuration, turning about said first constraining axis and controlling the movement by the actuator;

constraining again said first structure or carriage and said second support structure by said second pin-type fixing elements.

* * * * *